US012706759B2

(12) United States Patent
Zheng et al.

(10) Patent No.: US 12,706,759 B2
(45) Date of Patent: Aug. 11, 2026

(54) KEY MANAGEMENT AND SERVICE PROCESSING

(71) Applicant: Alipay (Hangzhou) Information Technology Co., Ltd., Hangzhou (CN)

(72) Inventors: Xianyi Zheng, Hangzhou (CN); Dengwei Xu, Hangzhou (CN); Zhi Xin, Hangzhou (CN); Xiaofei Wan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 22 days.

(21) Appl. No.: 18/788,737

(22) Filed: Jul. 30, 2024

(65) Prior Publication Data

US 2024/0388453 A1 Nov. 21, 2024

Related U.S. Application Data

(63) Continuation of application No. PCT/CN2023/071492, filed on Jan. 10, 2023.

(30) Foreign Application Priority Data

Jan. 30, 2022 (CN) ......................... 202210114372.1

(51) Int. Cl.
*H04L 9/32* (2006.01)

(52) U.S. Cl.
CPC .................................. *H04L 9/3268* (2013.01)

(58) Field of Classification Search
CPC ..... H04L 9/3268; H04L 63/061; H04L 9/083; H04L 63/0428; H04L 63/0823;
(Continued)

(56) References Cited

U.S. PATENT DOCUMENTS 9,722,775 B2 * 8/2017 Hjelm ..................... H04L 9/006
10,609,026 B2 * 3/2020 Han .................... H04W 12/086
(Continued)

FOREIGN PATENT DOCUMENTS

CN 103023911 4/2013
CN 106453196 2/2017
(Continued)

OTHER PUBLICATIONS

International Preliminary Report on Patentability in International Appln. No. PCT/CN2023/071492, mailed on Aug. 8, 2024, 13 pages (with English translation).
(Continued)

*Primary Examiner* — Techane Gergiso
(74) *Attorney, Agent, or Firm* — Fish & Richardson P.C.

(57) ABSTRACT

The present disclosure provides methods, apparatuses and systems for key management and service processing. In one aspect, a method includes receiving, by a authentication server from a trusted execution environment (TEE) of a terminal device, device authentication information through a secure channel between the TEE and the authentication server. The device authentication information is configured to prove an identity of the terminal device. The method includes performing, by the authentication server based on the device authentication information, device authentication on the terminal device. The method further includes in response to determining that the terminal device passes the device authentication, sending, by the authentication server, a service encryption key and a device identity certificate to the TEE through the secure channel. The service encryption key is configured to encrypt a service session key for encrypting service data, and the device identity certificate indicates authenticity of the terminal device.

20 Claims, 11 Drawing Sheets

(58) Field of Classification Search
CPC . H04L 2209/127; H04L 63/18; H04L 9/3271; H04L 63/00; H04L 9/3263; H04L 9/0897; H04L 9/0822; H04L 9/0877; H04L 9/3247
See application file for complete search history.

(56) References Cited

U.S. PATENT DOCUMENTS

| | | | | |
|---|---|---|---|---|
| 12,010,250 | B2* | 6/2024 | Wang | G06F 21/57 |
| 2004/0003245 | A1 | 1/2004 | Dabbish et al. | |
| 2005/0076216 | A1 | 4/2005 | Nyberg | |
| 2016/0099969 | A1 | 4/2016 | Angus et al. | |
| 2016/0234176 | A1* | 8/2016 | Chu | H04L 63/04 |
| 2016/0254904 | A1* | 9/2016 | Hjelm | H04L 9/006 713/155 |
| 2016/0365984 | A1 | 12/2016 | Lee et al. | |
| 2017/0201884 | A1 | 7/2017 | Zhong | |
| 2017/0289197 | A1* | 10/2017 | Mandyam | H04L 9/32 |
| 2017/0317990 | A1* | 11/2017 | Kim | H04W 12/065 |
| 2020/0028693 | A1* | 1/2020 | Wu | H04L 9/3263 |
| 2020/0067922 | A1 | 2/2020 | Avetisov et al. | |
| 2020/0178066 | A1* | 6/2020 | Park | H04L 63/0823 |
| 2020/0382321 | A1* | 12/2020 | Caceres | H04L 63/068 |
| 2021/0152339 | A1* | 5/2021 | Sun | H04L 9/14 |
| 2021/0176035 | A1* | 6/2021 | Cheng | H04L 63/06 |
| 2021/0176063 | A1* | 6/2021 | Liu | H04L 9/14 |
| 2021/0185531 | A1* | 6/2021 | Avetisov | H04W 12/108 |
| 2021/0281408 | A1 | 9/2021 | Liu et al. | |
| 2021/0288944 | A1 | 9/2021 | Petri et al. | |
| 2021/0306335 | A1* | 9/2021 | Avetisov | H04L 9/0643 |
| 2021/0320790 | A1* | 10/2021 | Nishimura | H04L 9/0897 |
| 2021/0385075 | A1 | 12/2021 | Sullivan et al. | |
| 2022/0109674 | A1* | 4/2022 | Avetisov | H04L 63/0884 |
| 2022/0350707 | A1* | 11/2022 | Hu | G06F 21/57 |
| 2022/0414216 | A1* | 12/2022 | Pan | G06F 21/57 |
| 2023/0344649 | A1* | 10/2023 | Zamani | G06Q 20/3227 |
| 2024/0214185 | A1* | 6/2024 | Li | H04L 9/083 |
| 2024/0244428 | A1* | 7/2024 | Kim | B60R 25/34 |

FOREIGN PATENT DOCUMENTS

| | | | |
|---|---|---|---|
| CN | 107679847 | | 2/2018 |
| CN | 108282467 | | 7/2018 |
| CN | 108768664 | | 11/2018 |
| CN | 110290102 | A | 9/2019 |
| CN | 110677418 | | 1/2020 |
| CN | 112787813 | A | 5/2021 |
| CN | 113962711 | | 1/2022 |
| CN | 114257382 | | 3/2022 |
| CN | 114826596 | | 7/2022 |
| CN | 115941336 | | 4/2023 |
| CN | 116032556 | | 4/2023 |
| CN | 117375832 | | 1/2024 |
| EP | 3860036 | A1 | 8/2021 |
| EP | 4293546 | | 12/2023 |
| KR | 2014-0135461 | | 11/2014 |

OTHER PUBLICATIONS

International Search Report and Written Opinion in International Appln. No. PCT/CN2023/071492, mailed on Jun. 13, 2023, 16 pages (with English translation).

Li et al., “Private Key distribution scheme of ID-based encryption,” Journal of Xidian University, Aug. 2004, 31(4):569-573 (with English Abstract).

Luo, “Application of cloud key system in outpatient electronic medical records,” Science and technology innovation herald, 2020, 4 pages (with machine translated English Abstract).

Extended European Search Report in European Appln. No. 23745920.1, mailed on Apr. 29, 2025, 8 pages.

* cited by examiner

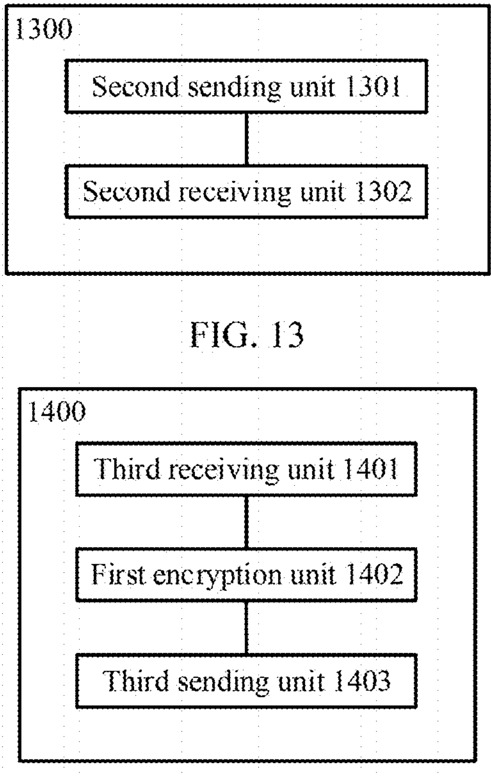
FIG. 13
FIG. 14
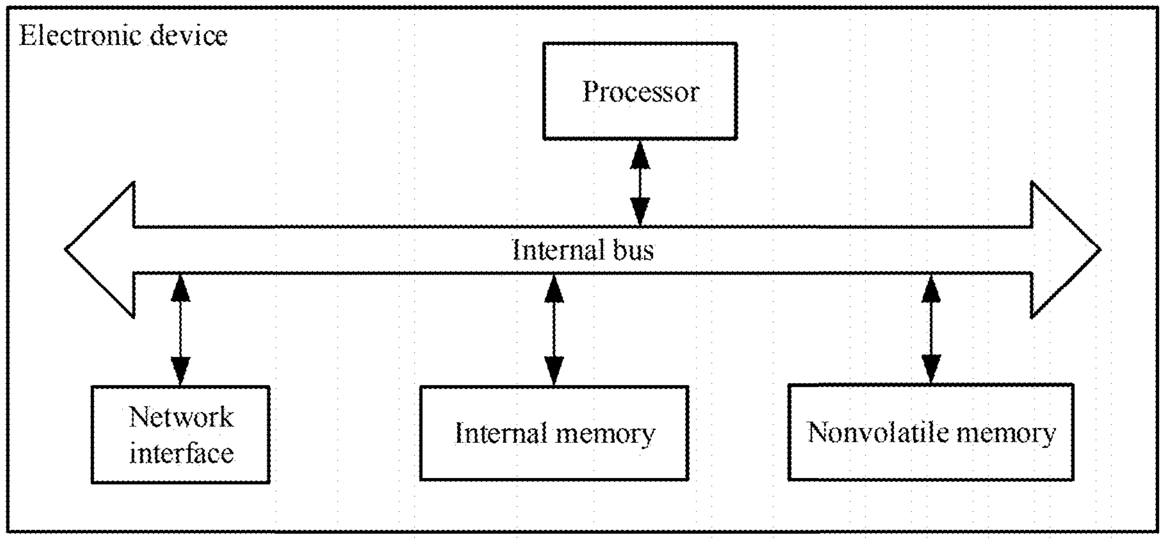
FIG. 15

KEY MANAGEMENT AND SERVICE PROCESSING

CROSS-REFERENCE TO RELATED APPLICATIONS

This application is a continuation of PCT Application No. PCT/CN2023/071492, filed on Jan. 10, 2023, which claims priority to Chinese Patent Application No. 202210114372.1, filed on Jan. 30, 2022, and each application is hereby incorporated by reference in its entirety.

TECHNICAL FIELD

This specification relates to the field of computer technologies, and in particular, to key management and service processing.

BACKGROUND

On a terminal device, a service party needs a terminal-side secure deployment key to implement reliable encrypted service data transmission. Generally, when a key required for service data transmission is deployed, a symmetric key is usually determined through negotiation between the service party and a trusted execution environment (TEE) set in the terminal device. However, as such, it is difficult to update the key due to fixation, and a risk of leakage of the symmetric key easily occurs, thereby causing leakage of all service data. Therefore, there is a relatively large security risk in a service data transmission and processing process.

SUMMARY

An objective of embodiments of this specification is to provide key management and service processing methods, apparatuses, and systems, to alleviate a current problem that a key is easily leaked in a manner in which a service party determines the key through negotiation with a TEE, causing a relatively large security risk in a service transmission and processing process.

Based on a first aspect, a key management method is provided, including: A trusted execution environment TEE sends device authentication information to an authentication server through a secure channel between the TEE and the authentication server, where the device authentication information is information used to prove an identity of a terminal device to which the TEE belongs; the authentication server performs, based on the device authentication information, device authentication on the terminal device to which the TEE belongs; and the authentication server sends, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

Based on a second aspect, a key management method is provided and applied to an authentication server, where the method includes: receiving, through a secure channel with a TEE, device authentication information sent by the TEE, where the device authentication information is stored in the TEE, and the device authentication information is used to prove an identity of a terminal device to which the TEE belongs; performing, based on the device authentication information, device authentication on the terminal device to which the TEE belongs; and sending, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

Based on a third aspect, a key management method is provided and applied to a TEE, where the method includes: sending device authentication information to an authentication server through a secure channel with the authentication server, where the device authentication information is information used to prove an identity of a terminal device to which the TEE belongs, and the device authentication information is used by the authentication server to perform device authentication on the terminal device; and receiving, through the secure channel, a service encryption key and a device identity certificate that are sent by the authentication server, where the service encryption key is used to encrypt and decrypt a service session key for encrypting service data, the device identity certificate is used to verify that the terminal device is authentic and trustworthy, and the service encryption key and the device identity certificate are sent by the authentication server after determining that the terminal device passes device authentication.

Based on a fourth aspect, a service processing method is provided, including: A TEE receives a service request sent by a service party, where the service request is sent when the service party receives a service processing request for a target service from a target user; the TEE encrypts, by using a generated service session key, a device identity certificate of a terminal device to which the TEE belongs and target service data, to obtain service ciphertext information, and encrypts the service session key by using a service encryption key, to obtain a service session key ciphertext, where the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; the TEE sends the service ciphertext information and the service session key ciphertext to the service party, so the service party sends the service ciphertext information and the service session key ciphertext to a service server; the service server decrypts the service session key ciphertext by using the service encryption key, to obtain the service session key, and decrypts the service ciphertext information by using the service session key, to obtain the device identity certificate and the target service data; and the service server performs device identity authentication on the terminal device based on the device identity certificate, and after determining that the terminal device passes device identity authentication, processes the target service based on the target service data.

Based on a fifth aspect, a service processing method is provided and applied to a TEE, where the method includes: receiving a service request sent by a service party, where the service request is sent when the service party receives a service processing request for a target service from a target user; encrypting, by using a generated service session key, target service data and a device identity certificate of a terminal device to which the TEE belongs, to obtain service ciphertext information, where the target service data are service data required for processing the target service; encrypting the service session key by using a service encryption key, to obtain a service session key ciphertext, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; and sending the service ciphertext information and the service session key ciphertext to the service party, so the service party sends the service ciphertext information and the service session key ciphertext to a service server, and the service server performs device identity authentication on the terminal device after performing decryption and processes the target service based on an authentication result of the device identity authentication.

Based on a sixth aspect, a service processing method is provided, where the method is applied to a service server and includes: receiving service ciphertext information and a service session key ciphertext that are sent by a service party, where the service ciphertext information and the service session key ciphertext are generated by a TEE in response to a non-service request of the service party and sent to the service party, the service ciphertext information is obtained after the TEE encrypts, by using a generated service session key, target service data and a device identity certificate of a terminal device to which the TEE belongs, the service session key ciphertext is obtained after the TEE encrypts the service session key by using a service encryption key, the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; decrypting the service session key ciphertext by using the service encryption key to obtain the service session key; decrypting the service ciphertext information by using the service session key, to obtain the device identity certificate and the target service data; performing device identity authentication on the terminal device based on the device identity certificate; and after determining that the terminal device passes device identity authentication, processing the target service based on the target service data.

Based on a seventh aspect, a key management system is provided, including a TEE and an authentication server, where the TEE sends device authentication information to the authentication server through a secure channel between the TEE and the authentication server, where the device authentication information is information used to prove an identity of a terminal device to which the TEE belongs; the authentication server performs, based on the device authentication information, device authentication on the terminal device to which the TEE belongs; and the authentication server sends, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

Based on an eighth aspect, a service processing system is provided, including a TEE and a service server, where the TEE receives a service request sent by a service party, where the service request is sent when the service party receives a service processing request for a target service from a target user; the TEE encrypts, by using a generated service session key, a device identity certificate of a terminal device to which the TEE belongs and target service data, to obtain service ciphertext information, and encrypts the service session key by using a service encryption key, to obtain a service session key ciphertext, where the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; the TEE sends the service ciphertext information and the service session key ciphertext to the service party, so the service party sends the service ciphertext information and the service session key ciphertext to the service server, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; the service server decrypts the service session key ciphertext by using the service encryption key, to obtain the service session key, and decrypts the service ciphertext information by using the service session key, to obtain the device identity certificate and the target service data; and the service server performs device identity authentication on the terminal device based on the device identity certificate, and after determining that the terminal device passes device identity authentication, processes the target service based on the target service data.

Based on a ninth aspect, a key management apparatus is provided and applied to an authentication server, where the apparatus includes: a first receiving unit, configured to receive, through a secure channel with a TEE, device authentication information sent by the TEE, where the device authentication information is stored in the TEE, and the device authentication information is information used to prove an identity of a terminal device to which the TEE belongs; a first authentication unit, configured to perform, based on the device authentication information, device authentication on the terminal device to which the TEE belongs; and a first sending unit, configured to: send, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

Based on a tenth aspect, a key management apparatus is provided and applied to a TEE, where the method includes: a second sending unit, configured to send device authentication information to an authentication server through a secure channel with the authentication server, where the device authentication information is information used to prove an identity of a terminal device to which the TEE belongs, and the device authentication information is used by the authentication server to perform device authentication on the terminal device; and a second receiving unit, configured to receive, through the secure channel, a service encryption key and a device identity certificate that are sent by the authentication server, where the service encryption key is used to encrypt and decrypt a service session key for encrypting service data, the device identity certificate is used to verify that the terminal device is authentic and trustworthy, and the service encryption key and the device identity certificate are sent by the authentication server after determining that the terminal device passes device authentication.

Based on an eleventh aspect, a service processing apparatus is provided and applied to a TEE, where the apparatus includes: a third receiving unit, configured to receive a service request sent by a service party, where the service request is sent when the service party receives a service processing request for a target service from a target user; a first encryption unit, configured to: encrypt, by using a generated service session key, target service data and a device identity certificate of a terminal device to which the TEE belongs, to obtain service ciphertext information, and encrypt the service session key by using a service encryption key, to obtain a service session key ciphertext, where the target service data are service data required for processing the target service; and a third sending unit, configured to send the service ciphertext information and the service session key ciphertext to the service party, so the service party sends the service ciphertext information and the service session key to a service server, and the service server performs device identity authentication on the terminal device after performing decryption, and processes the target service based on an authentication result of the device identity authentication, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device.

Based on a twelfth aspect, a service processing apparatus is provided and applied to a service server, where the apparatus includes: a fourth receiving unit, configured to receive service ciphertext information and a service session key ciphertext that are sent by a service party, where the service ciphertext information and the service session key ciphertext are generated by a TEE in response to a non-service request of the service party and sent to the service party, the service ciphertext information is obtained after the TEE encrypts, by using a generated service session key, target service data and a device identity certificate of a terminal device to which the TEE belongs, the service session key ciphertext is obtained after the TEE encrypts the service session key by using a service encryption key, the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; a first decryption unit, configured to: decrypt the service session key ciphertext by using the service encryption key, to obtain the service session key, and decrypt the service ciphertext information by using the service session key, to obtain the device identity certificate and the target service data; a second authentication unit, configured to perform device identity authentication on the terminal device based on the device identity certificate; and a service processing unit, configured to: after determining that the terminal device passes device authentication, process the target service based on the target service data.

Based on a thirteenth aspect, an electronic device is provided and applied to an authentication server, where the electronic device includes a processor and a memory, arranged to store a computer executable instruction, where when the executable instruction is being executed, the processor performs the following operations: receiving, through a secure channel with a TEE, device authentication information sent by the TEE, where the device authentication information is stored in the TEE, and the device authentication information is information used to prove an identity of a terminal device to which the TEE belongs; performing, based on the device authentication information, device authentication on the terminal device to which the TEE belongs; and sending, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

Based on a fourteenth aspect, a computer readable storage medium is provided and applied to an authentication server, where the computer readable storage medium stores one or more programs, and when the one or more programs are being executed by a terminal device including a plurality of applications, the terminal device performs the following operations: receiving, through a secure channel with a TEE, device authentication information sent by the TEE, where the device authentication information is stored in the TEE, and the device authentication information is information used to prove an identity of a terminal device to which the TEE belongs; performing, based on the device authentication information, device authentication on the terminal device to which the TEE belongs; and sending, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

Based on a fifteenth aspect, an electronic device is provided and applied to a TEE, where the electronic device includes a processor and a memory, arranged to store a computer executable instruction, where when the executable instruction is being executed, the processor performs the following operations: sending device authentication information to an authentication server through a secure channel with the authentication server, where the device authentication information is information used to prove an identity of a terminal device to which the TEE belongs, and the device authentication information is used by the authentication server to perform device authentication on the terminal device; and receiving, through the secure channel, a service encryption key and a device identity certificate that are sent by the authentication server, where the service encryption key is used to encrypt and decrypt a service session key for encrypting service data, the device identity certificate is used to verify that the terminal device is authentic and trustworthy, and the service encryption key and the device identity certificate are sent by the authentication server after determining that the terminal device passes device authentication.

Based on a sixteenth aspect, a computer readable storage medium is provided and applied to a TEE, where the computer readable storage medium stores one or more programs, and when the one or more programs are being executed by a terminal device including a plurality of applications, the terminal device performs the following operations: sending device authentication information to an authentication server through a secure channel with the authentication server, where the device authentication information is information used to prove an identity of a terminal device to which the TEE belongs, and the device authentication information is used by the authentication server to perform device authentication on the terminal device; and receiving, through the secure channel, a service encryption key and a device identity certificate that are sent by the authentication server, where the service encryption key is used to encrypt and decrypt a service session key for encrypting service data, the device identity certificate is used to verify that the terminal device is authentic and trustworthy, and the service encryption key and the device identity certificate are sent by the authentication server after determining that the terminal device passes device authentication.

Based on a seventeenth aspect, an electronic device is provided and applied to a TEE, where the electronic device includes a processor and a memory, arranged to store a computer executable instruction, and when the executable instruction is being executed, the processor performs the following operations: receiving a service request sent by a service party, where the service request is sent when the service party receives a service processing request for a target service from a target user; encrypting, by using a generated service session key, target service data and a device identity certificate of a terminal device to which the TEE belongs, to obtain service ciphertext information, where the target service data are service data required for processing the target service; encrypting the service session key by using a service encryption key, to obtain a service session key ciphertext, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; and sending the service ciphertext information and the service session key ciphertext to the service party, so the service party sends the service ciphertext information and the service session key ciphertext to a service server, and the service server performs device identity authentication on the terminal device after performing decryption and processes the target service based on an authentication result of the device identity authentication.

Based on an eighteenth aspect, a computer readable storage medium is provided and applied to a TEE, where the computer readable storage medium stores one or more programs, and when the one or more programs are being executed by a terminal device including a plurality of applications, the terminal device performs the following operations: receiving a service request sent by a service party, where the service request is sent when the service party receives a service processing request for a target service from a target user; encrypting, by using a generated service session key, target service data and a device identity certificate of a terminal device to which the TEE belongs, to obtain service ciphertext information, where the target service data are service data required for processing the target service; encrypting the service session key by using a service encryption key, to obtain a service session key ciphertext, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; and sending the service ciphertext information and the service session key ciphertext to the service party, so the service party sends the service ciphertext information and the service session key ciphertext to a service server, and the service server performs device identity authentication on the terminal device after performing decryption and processes the target service based on an authentication result of the device identity authentication.

Based on a nineteenth aspect, an electronic device is provided and is applied to a service server, where the electronic device includes a processor and a memory, arranged to store a computer executable instruction, and when the executable instruction is being executed, the processor performs the following operations: receiving service ciphertext information and a service session key ciphertext that are sent by a service party, where the service ciphertext information and the service session key ciphertext are generated by a TEE in response to a non-service request of the service party and sent to the service party, the service ciphertext information is obtained after the TEE encrypts, by using a generated service session key, target service data and a device identity certificate of a terminal device to which the TEE belongs, the service session key ciphertext is obtained after the TEE encrypts the service session key by using a service encryption key, the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; decrypting the service session key ciphertext by using the service encryption key to obtain the service session key; decrypting the service ciphertext information by using the service session key, to obtain the device identity certificate and the target service data; performing device identity authentication on the terminal device based on the device identity certificate; and after determining that the terminal device passes device identity authentication, processing the target service based on the target service data.

Based on a twentieth aspect, a computer readable storage medium is provided and applied to a service server, where the computer readable storage medium stores one or more programs, and when the one or more programs are being executed by a terminal device including a plurality of applications, the terminal device performs the following operations: receiving service ciphertext information and a service session key ciphertext that are sent by a service party, where the service ciphertext information and the service session key ciphertext are generated by a TEE in response to a non-service request of the service party and sent to the service party, the service ciphertext information is obtained after the TEE encrypts, by using a generated service session key, target service data and a device identity certificate of a terminal device to which the TEE belongs, the service session key ciphertext is obtained after the TEE encrypts the service session key by using a service encryption key, the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; decrypting the service session key ciphertext by using the service encryption key to obtain the service session key; decrypting the service ciphertext information by using the service session key, to obtain the device identity certificate and the target service data; performing device identity authentication on the terminal device based on the device identity certificate; and after determining that the terminal device passes device identity authentication, processing the target service based on the target service data.

In the solution of the embodiments of this specification, a secure channel is established between an authentication server and a TEE by using a security capability of the TEE, and the TEE sends, to the authentication server through the secure channel, device authentication information that can prove an identity of a terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel, so the TEE can encrypt and store, by using the service encryption key, a service session key used to encrypt service data. As such, not only the service session key is prevented from being leaked, but also security, confidentiality, and integrity of the service encryption key and the service session key are ensured by using a storage environment that is provided by the TEE and that is isolated from another execution environment, thereby improving security in a service data transmission and processing process. In addition, after determining that the terminal device to which the TEE belongs passes device authentication, the authentication server further sends, to the TEE through the secure channel, a device identity certificate used to verify that the terminal device is authentic and trustworthy, so in a process in which the TEE interacts with a service party, the TEE can further prove, by using the device identity certificate, that the terminal device to which the TEE belongs is trustworthy, and security of a service processing process is further improved. In addition, the service encryption key and the device identity certificate are delivered by the authentication server to the TEE through the secure channel between the authentication server and the TEE when determining that the terminal device to which the TEE belongs passes device authentication. As such, a complete key trust system is formed between the authentication server and the TEE, so as to ensure that the service encryption key deployed by the authentication server in the TEE is secure and valid. In addition, the service encryption key and the device identity certificate are sent to the TEE through the secure channel, so as to avoid leakage of the service encryption key and the device identity certificate in a transmission process, thereby further ensuring security in a subsequent service data transmission and processing process.

BRIEF DESCRIPTION OF DRAWINGS

FIG. 13 is a schematic structural diagram 2 illustrating a key management apparatus, according to one or more embodiments of this specification;

FIG. 14 is a schematic structural diagram 1 illustrating a service processing apparatus, according to one or more embodiments of this specification;

FIG. 15 is a schematic structural diagram 2 illustrating an electronic device, according to one or more embodiments of this specification;

DESCRIPTION OF EMBODIMENTS

Figure 1:
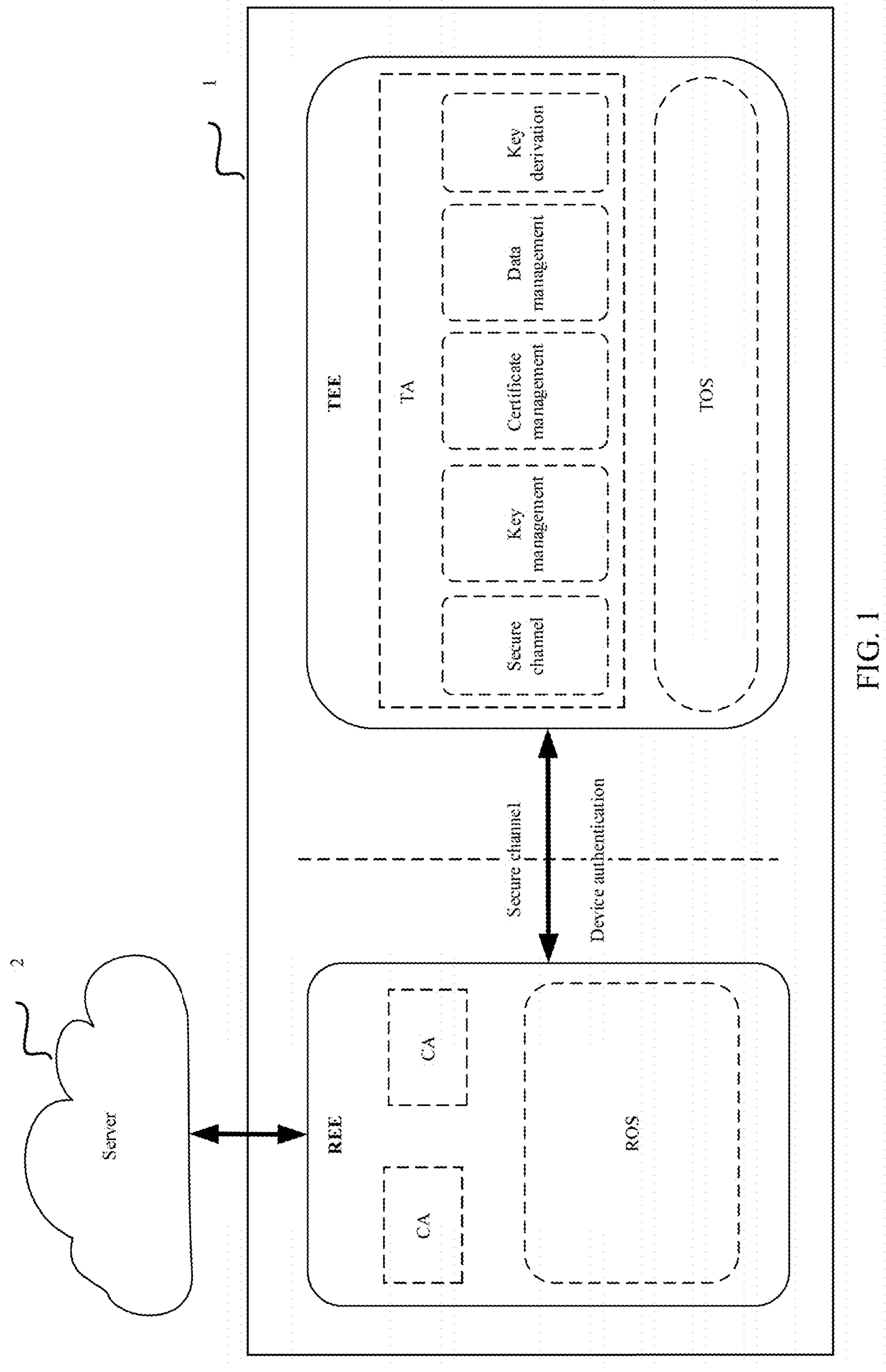
FIG. 1 is a schematic diagram illustrating a schematic system architecture, according to one or more embodiments of this specification.

As described above, on a terminal device, a service party needs a terminal-side secure deployment key to implement reliable encrypted service data transmission. Generally, when a key required for service data transmission is deployed, a symmetric key is usually determined through negotiation between the service party and a TEE set in the terminal device. However, as such, the symmetric key is easily leaked, thereby causing leakage of all service data. Therefore, there is a relatively large security risk in a service data transmission and processing process. It can be understood that how to ensure security and validity of a service session key used to encrypt service data is crucial.

To achieve the above-mentioned objective, based on a TEE, the embodiments of this specification provide a key management solution. A secure channel is established between an authentication server and the TEE by using a security capability of the TEE, and the TEE sends, to the authentication server through the secure channel, device authentication information that can prove an identity of a terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel, so the TEE can encrypt and store, by using the service encryption key, a service session key used to encrypt service data. As such, not only the service session key is prevented from being leaked, but also security, confidentiality, and integrity of the service encryption key and the service session key are ensured by using a storage environment that is provided by the TEE and that is isolated from another execution environment, thereby improving security in a service data transmission and processing process. In addition, after determining that the terminal device to which the TEE belongs passes device authentication, the authentication server further sends, to the TEE through the secure channel, a device identity certificate used to verify that the terminal device is authentic and trustworthy, so in a process in which the TEE interacts with a service party, the TEE can further prove, by using the device identity certificate, that the terminal device to which the TEE belongs is trustworthy, and security of a service processing process is further improved. In addition, the service encryption key and the device identity certificate are delivered by the authentication server to the TEE through the secure channel between the authentication server and the TEE when determining that the terminal device to which the TEE belongs passes device authentication. As such, a complete key trust system is formed between the authentication server and the TEE, so as to ensure that the service encryption key deployed by the authentication server in the TEE is secure and valid. In addition, the service encryption key and the device identity certificate are sent to the TEE through the secure channel, so as to avoid leakage of the service encryption key and the device identity certificate in a transmission process, thereby further ensuring security in a subsequent service data transmission and processing process.

Based on the above-mentioned key management solution, the embodiments of this specification further provide a service processing solution that is subsequently executed based on the service encryption key deployed in the TEE and the device identity certificate of the terminal device. The service data and the device identity certificate are encrypted and transmitted between the TEE and the service server based on the service encryption key deployed in the TEE, and the service server performs, based on the device identity certificate, device authentication on the terminal device to which the TEE belongs, to ensure that the terminal device to which the TEE belongs is authentic and trustworthy, thereby ensuring security of a service data transmission and processing process. The service processing solution provided in the embodiments of this specification can provide services for many service scenarios, such as payment without internet, privacy risk control, and model protection. This is not specifically limited in the embodiments of this specification.

The technical solutions provided in the embodiments of this specification are described in detail below with reference to the accompanying drawings.

A possible application scenario of the technical solutions provided in the embodiments of this specification is first described with reference to FIG. 1.

FIG. 1 is a schematic diagram illustrating a schematic system architecture, according to one or more embodiments of this specification. The system framework shown in FIG. 1 includes a terminal device 1 and a server 2. An execution environment such as a TEE and a general-purpose execution environment (Rich Execution Environment, REE) can be set in the terminal device 1.

The TEE is an execution environment that is obtained from the terminal device in a manner of software and hardware combination by adding a hardware extension capability to an existing processor of the terminal device 1 and that is isolated from another application execution environment in the terminal device 1. In other words, the TEE is an independent area in the terminal device 1. Therefore, security, confidentiality, and integrity of a key, a certificate, data, etc. that are placed in the TEE can be ensured. A trusted application (TA) and a TEE system (Trusted Operation System, TOS) can run in the TEE. The TA can establish, with an external environment (for example, an REE), a secure channel used for data exchange, and provide functions such as key management (for example, management of a service session key used for encrypted service data transmission), certificate management (for example, management of a certificate used to prove the TEE and an identity of a terminal device to which the TEE belongs), and data management (for example, management of sensitive data involved in a service). For example, by using the certificate management function provided by the TA, the TEE can store a device certificate that is issued by a device provider for the terminal device to which the TEE belongs and that is used to prove the identity of the terminal device. By using the data management function provided by the TA, the TEE can store some sensitive data involved in a service processing process, such as personal private data of a user or a key identifier that is delivered by the server 2 and that is used to uniquely identify a service encryption key. By using a key derivation function provided by the TA, when a service party requests to perform service processing, the TEE can derive, by using a generated device identity private key and a user identifier carried in the service request, a service identity private key used to sign service data. Correspondingly, the server 2 (for example, the service server) can derive, based on a service identity public key from the TEE and the user identifier, a service identity public key used to verify the signature. By using the key management function, the TEE can randomly generate a service session key used to encrypt and decrypt the service data, and the TEE can dynamically generate the service session key, that is, the service session key used to encrypt and decrypt the service data required for current service processing is randomly generated each time the service party requests to perform service processing. By using the key management function, the TEE can further encrypt the service session key by using a service encryption key delivered by the server 2, to avoid leakage of the service session key, and store and manage the private key (for example, used as a service identity) generated by using the key derivation function, the service session key delivered by the authentication server 2, the key identifier, etc.

The REE can run an application (Client Application, CA) that has a low security requirement and an REE (Rich Operation System, ROS). The REE can separately exchange information with the TEE and the server 2.

The server 2 can include an authentication server and a service server. The authentication server can complete management of the service session key by interacting with the TEE by using the REE in the terminal device 1, and the service server can complete service processing by interacting with the TEE by using the REE in the terminal device 1.

In a process of deploying the service encryption key, the TEE can establish a secure channel with the REE, and exchange information with the REE through the secure channel. Then, the REE exchanges information with the authentication server, to establish a secure channel between the TEE and the authentication server, and implement secure transmission of information exchanged between the TEE and the authentication server. The TEE can send, to the authentication server through the secure channel with the authentication server, device authentication information that can prove the identity of the terminal device to which the TEE belongs. The authentication server can perform, based on the received device authentication information, device authentication on the terminal device to which the TEE belongs, to determine whether the terminal device to which the TEE belongs is authentic and trustworthy. After determining that the terminal device is authentic and trustworthy, the authentication server sends, to the TEE through the secure channel between the authentication server and the TEE, the service encryption key used to encrypt and decrypt the service session key required for encrypting and decrypting the service data, the device identity certificate used to prove that the terminal device to which the TEE belongs is authentic and trustworthy, sensitive data (for example, a key identifier used to uniquely identify the service encryption key) involved the service, etc. The TEE stores the information. Because the TEE can provide a storage environment isolated from another execution environment for the information, security, confidentiality, and integrity of the information can be ensured.

In a service processing process, the TEE can encrypt, based on a service request of a service party (for example, another application CA in the terminal device 1) by using the service session key, service data required for performing service processing and the device identity certificate of the terminal device to which the TEE belongs, to obtain service ciphertext information, encrypt the service session key by using the service encryption key, to obtain a service session key ciphertext, and then return the service ciphertext information and the service session key ciphertext to the service party, so the service party forwards the service ciphertext information and the service session key ciphertext to the service server. The service server first decrypts the service session key ciphertext by using the service encryption key, to obtain the service session key, then decrypts the service ciphertext information by using the service session key, to obtain the service data and the device identity certificate of the terminal device, and after device authentication performed, based on the device identity certificate of the terminal device, on the terminal device to which the TEE belongs succeeds, performs corresponding service processing based on the service data. Therefore, security and reliability of the service processing process can be ensured.

Further, the TEE processing can return, to the service party, the key identifier of the service encryption key used for encrypting the service session key, and the service party sends the key identifier of the service encryption key to the service server. Correspondingly, after receiving the key identifier, the service server can determine a service encryption key to be used based on the key identifier, first decrypt the service session key ciphertext by using the service encryption key, to obtain the service session key, and then decrypt the service ciphertext information by using the service session key, to obtain target service data and the device identity certificate of the terminal device.

Figure 2:
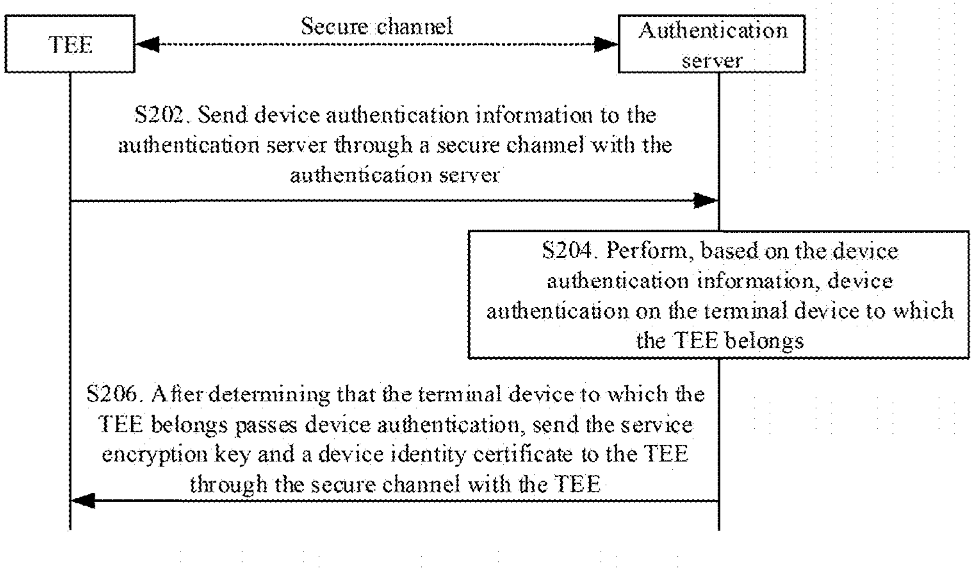
FIG. 2 is a schematic flowchart 1 illustrating a key management method, according to one or more embodiments of this specification.

Based on the system architecture shown in FIG. 1, an embodiment of this specification provides a key management method. Referring to FIG. 2, FIG. 2 is a schematic flowchart illustrating a key management method, according to one or more embodiments of this specification. The figure describes a specific implementation of interaction between a TEE and an authentication server. As shown in FIG. 2, the method can include the following steps. S202. The TEE sends device authentication information to the authentication server through a secure channel between the TEE and the authentication server.

The device authentication information is information used to prove an identity of a terminal device to which the TEE belongs.

In this embodiment of this specification, a secure channel is established between the TEE and the authentication server. As such, information exchange is performed between the TEE and the authentication server through the secure channel, and content of the information exchange is not intercepted by outsiders.

In an optional implementation, a channel key can be determined through negotiation between the TEE and the authentication server in advance, and the TEE and the authentication server perform encrypted transmission of interaction information based on the channel key determined through negotiation. As such, a secure channel between the TEE and the authentication server is established. The interaction information that is encrypted and transmitted by using the channel key cannot be intercepted by outsiders to obtain content of the interaction information, thereby effectively ensuring security of the interaction information.

Specifically, S202 can include: The TEE encrypts a device certificate of the terminal device based on a predetermined channel key, to obtain the device authentication information; and then sends the device authentication information to the authentication server. The device certificate of the terminal device can be a certificate that is issued by a device provider for the terminal device and that is used to prove an identity of the terminal device. The device certificate of the terminal device to which the TEE belongs is pre-stored in the TEE, so the device certificate is isolated from another application execution environment in the terminal device, thereby ensuring security, confidentiality, and integrity of the device certificate.

More specifically, in S204, when encrypting the device certificate of the terminal device based on the predetermined channel key to obtain the device authentication information, the TEE can sign a challenge code from the authentication server to obtain first signature information, and then encrypt the device certificate of the terminal device and the first signature information by using the channel key to obtain the device authentication information. As such, after decrypting the device authentication information, the authentication server can verify the first signature information of the TEE, to ensure that the received device authentication information is sent by a trusted TEE, and further ensure that the device certificate obtained through decryption is trustworthy.

In practice, when encrypting the device certificate of the terminal device and the first signature information by using the channel key, the TEE can first copy the first signature information to follow the device certificate, and then encrypt the device certificate and the first signature information following the device certificate by using the channel key, to obtain the device certificate information.

S204. The authentication server performs, based on the device authentication information, device authentication on the terminal device to which the TEE belongs.

Because the device authentication information of the terminal device can prove the identity of the terminal device, the authentication server can perform, based on the device authentication information from the TEE, device authentication on the terminal device to which the TEE belongs, to determine whether the terminal device to which the TEE belongs is authentic and trustworthy, thereby avoiding leakage of a service session key used to encrypt the service data because the authentication server deploys a service encryption key to a TEE in an unauthorized terminal device, and further improving security of the service encryption key.

In an optional implementation, the device authentication information received by the authentication server is obtained by encrypting, by the TEE by using a channel key determined through negotiation in advance, the device certificate of the terminal device to which the TEE belongs. In this case, S204 can include: The authentication server decrypts the device certificate by using the channel key, to obtain the device certificate of the terminal device, and performs device authentication on the terminal device based on the device certificate of the terminal device. For example, the authentication server can compare the device certificate obtained through decryption with an identity certificate issued by the device provider for the terminal device. If they are consistent after comparison, it can be determined that the terminal device to which the TEE belongs is authentic and trustworthy. Otherwise, it is determined that the terminal device to which the TEE belongs is an unauthorized terminal device.

In another optional implementation, the device authentication information received by the authentication server is obtained after the TEE encrypts, by using a channel key determined through negotiation in advance, the device certificate of the terminal device to which the TEE belongs and the first signature information of the TEE, where the first signature information is obtained by the TEE by signing the challenge code from the authentication server. In this case, S204 can include: The authentication server decrypts the device authentication information by using the channel key, to obtain the device certificate of the terminal device and the first signature information, and then verifies the first signature information, to ensure that the device authentication information is sent by a trusted TEE. After determining that verification on the first signature information succeeds, the authentication server compares the challenge code in the first signature information with a locally stored challenge code, and if they are consistent after comparison, performs device authentication on the terminal device based on the device certificate of the terminal device. It can be understood that, in this implementation, the TEE uses a signature of the challenge code from the authentication server when obtaining the device authentication information through encryption. After decrypting the device authentication information, the authentication server further verifies the first signature information of the TEE and verifies the challenge code in the first signature information. Therefore, it can be ensured that the received device authentication information is sent by a trusted TEE, and it can further be ensured that the device certificate obtained through decryption is trustworthy.

S206. After determining that the terminal device to which the TEE belongs passes device authentication, the authentication server sends the service encryption key and a device identity certificate to the TEE through the secure channel between the authentication server and the TEE.

The service encryption key is used to encrypt and decrypt the service session key for encrypting the service data. In this embodiment of this specification, service encryption keys corresponding to different services can be the same, or can be different. For example, there is a one-to-one correspondence between a service and a service encryption key, and the service encryption key is used to encrypt and decrypt a service session key of a corresponding service. In practice, the authentication server can deploy a corresponding service encryption key in the TEE through the secure channel between the authentication server and the TEE based on a service requirement from the TEE. In addition, the service requirement of the TEE can dynamically change. In this case, the authentication server can deploy, through the secure channel between the authentication server and the TEE, a corresponding service encryption key to the TEE in real time based on the service requirement of the TEE that dynamically changes, to avoid a security risk caused by fixation of the service encryption key. In addition, the service session key is randomly generated by the TEE. Preferably, the service session key can be dynamically generated by the TEE, that is, one key is generated each time. Each time the service party requests to perform service processing, a service session key used to encrypt and decrypt service data required for current service processing is randomly generated, to avoid a security risk caused by fixation of the service session key.

The device identity certificate is used to verify that the terminal device is authentic and credible. For example, the authentication server can use a device identity public key that is transmitted by the TEE to the authentication server to review and produce a device identity certificate for the terminal to which the TEE belongs, then encrypt the device identity certificate by using the channel key determined through negotiation with the TEE, and then send the encrypted device identity certificate to the TEE.

As described above, a channel key can be determined through negotiation between the TEE and the authentication server in advance, and the TEE and the authentication server perform encrypted transmission of interaction information based on the channel key determined through negotiation. As such, a secure channel between the TEE and the authentication server is established. The interaction information that is encrypted and transmitted by using the channel key cannot be intercepted by outsiders to obtain content of the interaction information, thereby effectively ensuring security of the interaction information. Based on this, in an optional implementation, S206 can include: The authentication server encrypts the service encryption key by using the predetermined channel key, to obtain an encrypted service encryption key; and then sends the encrypted service encryption key and the device identity certificate to the TEE, so the TEE obtains the service encryption key and the device identity certificate through decryption by using the channel key, so the TEE can encrypt the service session key by using the service encryption key. It can be understood that after the service encryption key and the device identity certificate are encrypted by using the channel key determined through negotiation with the TEE, the service encryption key and the device identity certificate are sent to the TEE, which can ensure that the service encryption key and the device identity certificate are invisible to outsiders and cannot be intercepted by outsiders, and can ensure transmission security of the service encryption key and the device identity certificate. In addition, because the TEE is isolated from another application execution environment in the terminal device, the service encryption key and the device identity certificate are transmitted to the TEE, and the TEE stores, by using the service encryption key, the service session key used to encrypt the service data. The TEE can further prove, by using the device identity certificate, that the terminal device to which the TEE belongs is authentic and trustworthy, so security of storing and using the service session key can be effectively ensured.

In practice, after the authentication server deploys, to the TEE, the device identity certificate of the terminal device to which the TEE belongs, the TEE can actively report, to the authentication server in real time, a storage status of the device identity certificate and/or the service encryption key. Certainly, the authentication server can also actively query, from the TEE in real time, the storage status of the device identity certificate and/or the service encryption key stored in the TEE. In addition, after determining that the terminal device to which the TEE belongs passes device authentication, the authentication server can further send, through the secure channel between the authentication server and the TEE, sensitive data etc. involved in the service to the TEE for storage, to ensure storage security and use security of the sensitive data by using an environment that is provided by the TEE and that is secure, trustworthy, and isolated. For example, the authentication server can further send, to the TEE through the secure channel between the authentication server and the TEE, a key identifier that uniquely identifies the service encryption key, so during subsequent service processing, the service server can determine, based on the key identifier, which service encryption key to be used.

Figure 3:
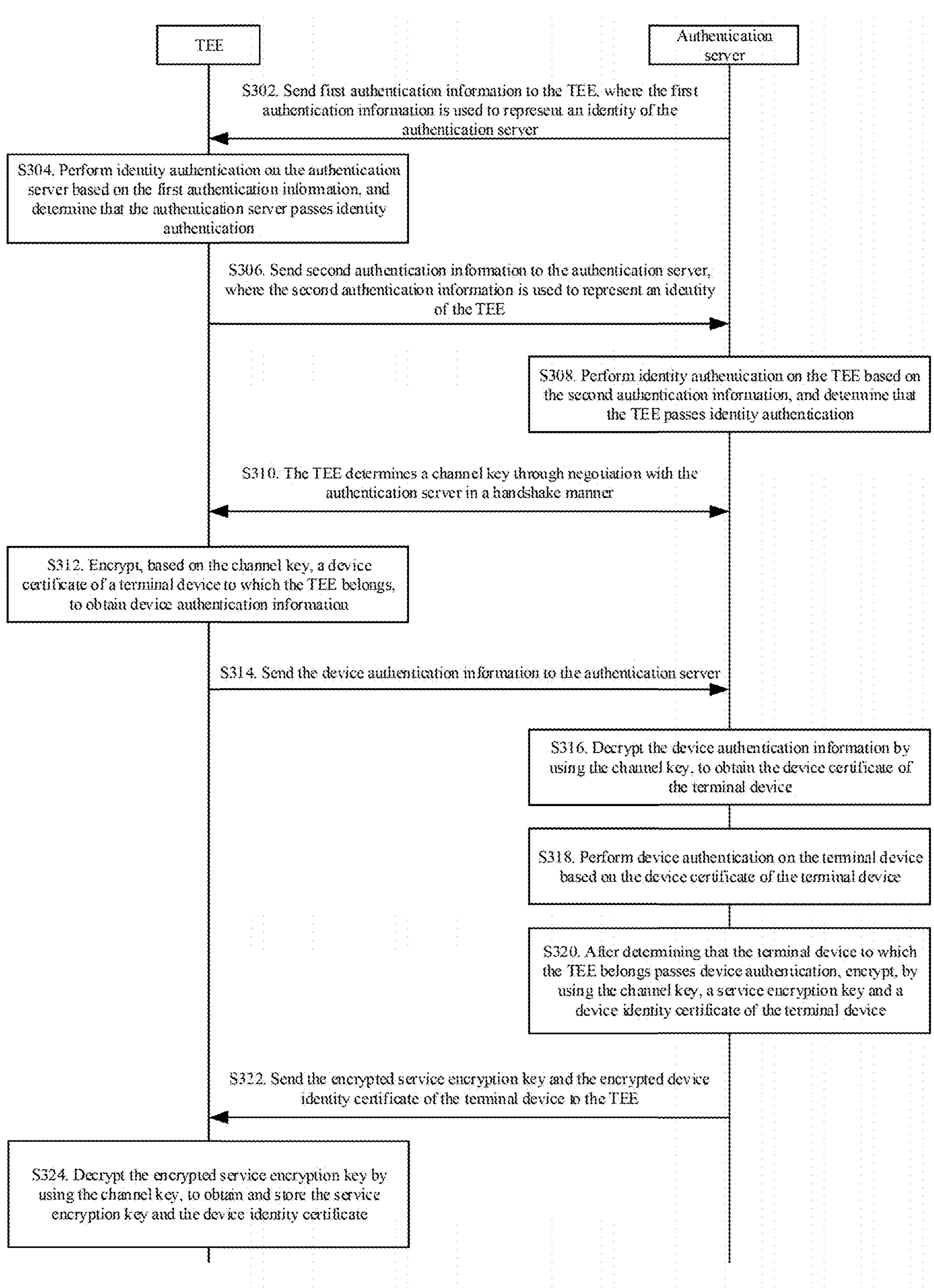
FIG. 3 is a schematic flowchart 2 illustrating a key management method, according to one or more embodiments of this specification.

In this embodiment of this specification, the channel key can be negotiated between the TEE and the authentication server in advance, or can be negotiated in another manner, which is not specifically limited here. To further ensure that the service encryption key and the device identity certificate that are deployed by the authentication server for the TEE are secure and valid, in an optional implementation, the TEE and the authentication server can perform identity authentication on each other, that is, the TEE performs identity authentication on the authentication server to determine whether the authentication server is authentic and trustworthy, and the authentication server performs identity authentication on the TEE to determine whether the TEE is authentic and trustworthy. The channel key is determined through negotiation after the TEE and the authentication server pass identity authentication. Specifically, as shown in FIG. 3, a process of determining a channel key through negotiation between a TEE and an authentication server includes the following steps: S302. The authentication server sends first authentication information to the TEE.

The first authentication information is used to represent an identity of the authentication server. For example, the first authentication information can include a device certificate of the authentication server, and the device certificate can be a certificate that is issued by a device provider for the authentication server and that is used to prove the identity of the authentication server. Or the authentication server and the TEE are separately pre-deployed with an authentication key, and the first authentication information can be obtained by the authentication server by encrypting specific information (for example, a challenge code) by using the authentication key. As such, if the TEE can obtain the specific information through decryption by using the authentication key, it can be determined that the authentication server passes identity authentication.

S304. The TEE performs identity authentication on the authentication server based on the first authentication information, and determines that the authentication server passes identity authentication.

The TEE can compare the received first authentication information with locally predetermined first authentication information, and if they are consistent after comparison, can determine that the authentication server passes identity authentication. For example, the TEE can compare the received device certificate of the authentication server with the device certificate that is of the authentication server and that is obtained from the device provider. If they are consistent after comparison, it is determined that the authentication server passes identity authentication. Therefore, it can be determined that the authentication server is an authentic and trustworthy authentication server.

S306. The TEE sends second authentication information to the authentication server.

The second authentication information is used to represent an identity of the TEE. For example, the second authentication information can include a certificate of the TEE, and the certificate can be a certificate that is issued by the device provider for the TEE and that is used to prove the identity of the TEE. Or the authentication server and the TEE are separately pre-deployed with an authentication key, and the second authentication information can be obtained by the TEE by encrypting specific information (for example, a challenge code) by using the authentication key. As such, if the authentication server can obtain the specific information through decryption by using the authentication key, it can be determined that the TEE passes identity authentication.

S308. The authentication server performs identity authentication on the TEE based on the second authentication information, and determines that the TEE passes identity authentication.

The authentication server can compare the received second authentication information with locally predetermined second authentication information, and if they are consistent after comparison, can determine that the TEE passes identity authentication. For example, the authentication server can compare the received device certificate of the TEE with the device certificate that is of the TEE and that is obtained from the device provider. If they are consistent after comparison, it is determined that the TEE passes identity authentication. Therefore, it can be determined that the TEE is an authentic and trustworthy TEE.

S310. The TEE determines a channel key with the authentication server in a handshake manner.

For example, the TEE can send channel key solutions that can be supported to the authentication server. The authentication server selects one channel key solution from the channel key solutions as a target channel encryption solution, encrypts the target channel encryption solution by using a public key of the TEE, and then sends the encrypted target channel encryption solution to the authentication server. Then, the TEE decrypts, by using a private key of the TEE, the encrypted target channel encryption solution to obtain the target channel encryption solution, then generates the channel key based on the target channel encryption solution, encrypts the channel key by using a public key of the authentication server, and sends the encrypted channel key to the authentication server. The authentication server decrypts the encrypted channel key by using a private key of the authentication server, to obtain the channel key. As such, the TEE and the authentication server complete negotiation of the channel key.

The above-mentioned channel key negotiation process through handshake is merely an example for description. In practice, there can be another implementation, provided that it is ensured that the channel key can be determined through negotiation between the TEE and the authentication server.

Further, after determining the channel key through negotiation with the authentication server, the TEE can exchange information with the authentication server based on the channel key. Specifically, in the technical solution of this embodiment of this specification, after S310, the method further includes: S312. The TEE encrypts, based on the channel key, a device certificate of a terminal device to which the TEE belongs, to obtain device authentication information.

S314. The TEE sends the device authentication information to the authentication server.

S316. The authentication server decrypts the device authentication information by using the channel key, to obtain the device certificate of the terminal device.

S318. The authentication server performs, based on the device certificate of the terminal device, device authentication on the terminal device to which the TEE belongs.

S320. After determining that the terminal device to which the TEE belongs passes device authentication, the authentication server encrypts, by using the channel key, a service encryption key and a device identity certificate issued to the terminal device.

The service encryption key is used to encrypt and decrypt the service session key for encrypting the service data. The device identity certificate issued to the terminal device is used to prove that the terminal device is authentic and trustworthy.

S322. The authentication server sends the encrypted service encryption key and the encrypted device identity certificate to the TEE.

S324. The TEE decrypts the encrypted service encryption key and the encrypted device identity certificate by using the channel key, to obtain and store the service encryption key and the device identity certificate.

For specific implementation of steps in S312 to S324, refer to specific implementation of corresponding steps in the embodiment shown in FIG. 2. Details are omitted here for simplicity.

It can be understood that, in the above-mentioned implementation, after the TEE and the authentication server pass mutual authentication, the channel key is determined through negotiation in the handshake manner, which can ensure that both the TEE and the authentication server are authentic and trustworthy. On this basis, the authentication server further performs device authentication on the terminal device to which the TEE belongs, and deploys the service encryption key to the TEE after determining that the terminal device to which the TEE belongs passes device authentication. This can ensure that the terminal device to which the TEE belongs is authentic and trustworthy. As such, a complete key trust system is formed between the authentication server and the TEE, and ensure that the service encryption key deployed by the authentication server in the TEE is secure and valid.

The above-mentioned key negotiation process is merely an example for description. In practice, there can be another implementation, provided that the TEE and the authentication server pass mutual authentication and the channel key is determined through negotiation.

In addition, the channel key determined through negotiation between the TEE and the authentication server can be a dynamic key, that is, a new key can be determined through negotiation in the above-mentioned manner each time before data transmission is performed between the TEE and the authentication server. As such, the TEE and the authentication server negotiate a new channel key before each data transmission, and perform data transmission based on the negotiated new channel key, thereby further improving security of data transmission. For example, in the solution of this embodiment, before sending the device authentication information to the authentication server each time, the TEE negotiates with the authentication server to determine a new channel key, and sends the device authentication information based on the new channel key, so transmission security of the device authentication information can be further ensured. Before sending the service encryption key and the device identity certificate to the TEE each time, the authentication server negotiates with the TEE to determine a new channel key, and sends the service encryption key and the device identity certificate to the TEE, to further ensure transmission security of the service encryption key and the device identity certificate.

Based on the key management method provided in this embodiment of this specification, a secure channel is established between an authentication server and a TEE by using a security capability of the TEE, and the TEE sends, to the authentication server through the secure channel, device authentication information that can prove an identity of a terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel, so the TEE can encrypt and store, by using the service encryption key, a service session key used to encrypt service data. As such, not only the service session key is prevented from being leaked, but also security, confidentiality, and integrity of the service encryption key and the service session key are ensured by using a storage environment that is provided by the TEE and that is isolated from another execution environment, thereby improving security in a service data transmission and processing process. In addition, after determining that the terminal device to which the TEE belongs passes device authentication, the authentication server further sends, to the TEE through the secure channel, a device identity certificate used to verify that the terminal device is authentic and trustworthy, so in a process in which the TEE interacts with a service party, the TEE can further prove, by using the device identity certificate, that the terminal device to which the TEE belongs is trustworthy, and security of a service processing process is further improved. In addition, the service encryption key and the device identity certificate are delivered by the authentication server to the TEE through the secure channel between the authentication server and the TEE when determining that the terminal device to which the TEE belongs passes device authentication. As such, a complete key trust system is formed between the authentication server and the TEE, so as to ensure that the service encryption key deployed by the authentication server in the TEE is secure and valid. In addition, the service encryption key and the device identity certificate are sent to the TEE through the secure channel, so as to avoid leakage of the service encryption key and the device identity certificate in a transmission process, thereby further ensuring security in a subsequent service data transmission and processing process.

Figures 4, 5:
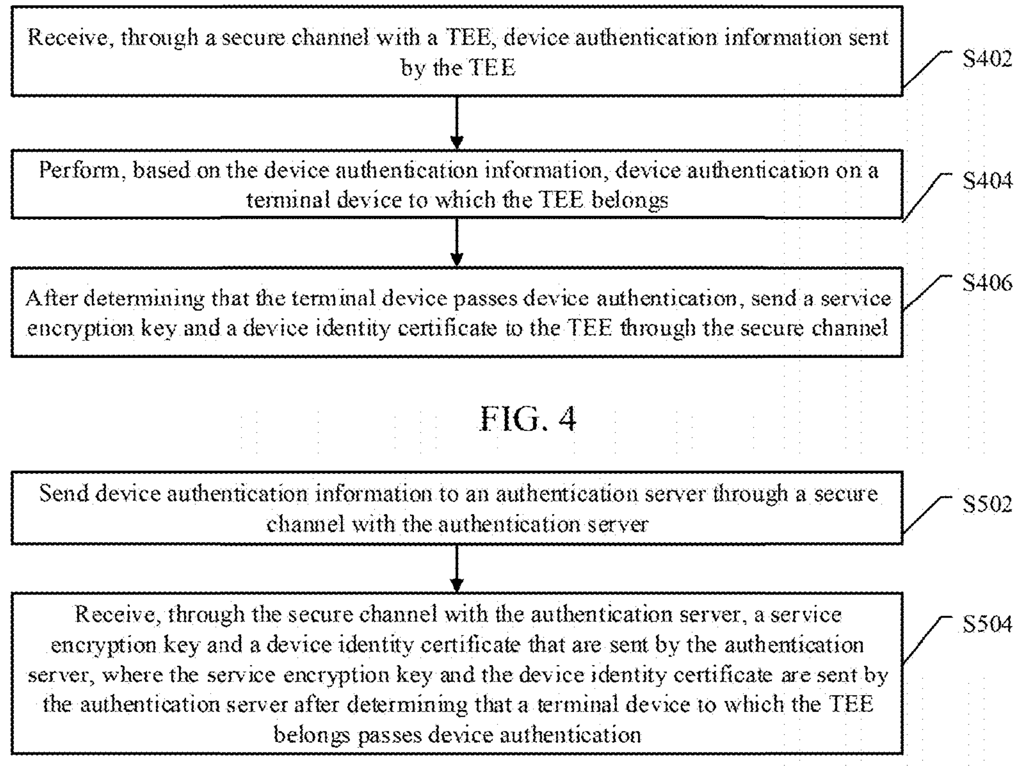
FIG. 4 is a schematic flowchart 3 illustrating a key management method, according to one or more embodiments of this specification.
FIG. 5 is a schematic flowchart 4 illustrating a key management method, according to one or more embodiments of this specification.

FIG. 4 is a schematic flowchart illustrating a key management method, according to one or more embodiments of this specification. The key management method shown in FIG. 4 can be executed by the server 2 shown in FIG. 1. The method can include the following steps:

S402. Receive, through a secure channel with a TEE, device authentication information sent by the TEE.

The device authentication information is stored in the TEE. The device authentication information is information used to prove an identity of a terminal device to which the TEE belongs.

S404. Perform, based on the device authentication information, device authentication on the terminal device to which the TEE belongs.

In an optional implementation, the device authentication information is obtained after the TEE encrypts a device certificate of the terminal device by using a predetermined channel key, and the channel key is determined by the authentication server and the TEE through negotiation in advance. In this case, S404 includes: decrypting the device authentication information by using the channel key, to obtain the device certificate of the terminal device, and then performing device authentication on the terminal device based on the device certificate of the terminal device.

In another optional implementation, the received device authentication information is obtained after the TEE encrypts, by using a channel key determined through negotiation in advance, the device certificate of the terminal device to which the TEE belongs and the first signature information of the TEE, where the first signature information is obtained by the TEE by signing a challenge code from the authentication server. In this case, S404 includes: decrypting the device authentication information by using the channel key, to obtain the device certificate of the terminal device and the first signature information, and then verifying the first signature information, to ensure that the device authentication information is sent by a trusted TEE; and after determining that verification on the first signature information succeeds, comparing the challenge code in the first signature information with a locally stored challenge code, and if they are consistent after comparison, performing device authentication on the terminal device based on the device certificate of the terminal device. It can be understood that, in this implementation, the TEE uses a signature of the challenge code from the authentication server when obtaining the device authentication information through encryption. After decrypting the device authentication information, the authentication server further verifies the first signature information of the TEE and verifies the challenge code in the first signature information. Therefore, it can be ensured that the received device authentication information is sent by a trusted TEE, and it can further be ensured that the device certificate obtained through decryption is trustworthy.

In this embodiment of this specification, the device certificate of the terminal device can be a certificate that is pre-issued by a device manufacturer for the terminal device and that is used to prove an identity of the terminal device, and the device certificate can be pre-stored in the TEE of the terminal device.

S406. After determining that the terminal device passes device authentication, send a service encryption key and a device identity certificate to the TEE through the secure channel.

The service encryption key is used to encrypt and decrypt the service session key for encrypting the service data. In this embodiment, service encryption keys corresponding to different services can be the same or can be different. Preferably, to further improve security of service data transmission and processing, different services are corresponding to different service encryption keys, and the service encryption key is used to encrypt and decrypt a service session key of a corresponding service.

The device identity certificate is used to verify that the terminal device to which the TEE belongs is authentic and trustworthy.

In an optional implementation, S406 includes: encrypting the service encryption key and the device identity certificate by using a predetermined channel key, to obtain an encrypted service encryption key and an encrypted device identity certificate, where the channel key is determined by the authentication server and the TEE through negotiation in advance; and sending the encrypted service encryption key and the encrypted device identity certificate to the TEE, so the TEE performs decryption by using the channel key to obtain the service encryption key and the device identity certificate.

Optionally, after S406, the key management method in this embodiment can further include: sending first authentication information to the TEE, where the first authentication information is used to represent an identity of the authentication server, and the first authentication information is used by the TEE to perform identity authentication on the authentication server; receiving second authentication information sent by the TEE, and performing identity authentication on the TEE based on the second authentication information, where the second authentication information is used to represent an identity of the TEE; and after determining that the TEE passes identity authentication, determining the channel key through negotiation with the TEE in a handshake manner.

For specific implementation of steps in S402 to S406, refer to specific implementation of corresponding steps in the embodiment shown in FIG. 2. Details are omitted here for simplicity.

FIG. 5 is a schematic flowchart illustrating a key management method, according to one or more embodiments of this specification. The key management method shown in FIG. 4 can be executed by the TEE in the terminal device 1 shown in FIG. 1. The method can include the following steps:

S502. Send device authentication information to an authentication server through a secure channel with the authentication server.

The device authentication information is information used to prove an identity of a terminal device to which the TEE belongs, and the device authentication information is used by the authentication server to perform device authentication on the terminal device to which the TEE belongs.

In an optional implementation, S502 includes: encrypting, based on a predetermined channel key, a device certificate of the terminal device to which the TEE belongs, to obtain the device authentication information, and sending the device authentication information to the authentication server. The device certificate of the terminal device to which the TEE belongs is pre-stored in the TEE, and the channel key is obtained by the authentication server through negotiation with the TEE in advance. More specifically, the encrypting, based on a predetermined channel key, a device certificate of the terminal device to which the TEE belongs, to obtain the device authentication information includes: signing a challenge code from the authentication server, to obtain first signature information; and encrypting the device certificate of the terminal device and the first signature data by using the channel key, to obtain the device authentication information.

S504. Receive, through the secure channel with the authentication server, a service encryption key and a device identity certificate that are sent by the authentication server.

The service encryption key is used to encrypt and decrypt the service session key for encrypting the service data. The service encryption key is sent by the authentication server after determining that the terminal device to which the TEE belongs passes device authentication.

The device identity certificate is used to prove that the terminal device to which the TEE belongs is authentic and trustworthy.

In an optional implementation, S504 includes: receiving an encrypted service encryption key and an encrypted device identity certificate that are sent by the TEE, and decrypting the encrypted service encryption key and the encrypted device identity certificate by using the channel key, to obtain the service encryption key and the device identity certificate, where the encrypted service encryption key is obtained after the TEE encrypts the service encryption key by using a predetermined channel key, the encrypted device identity certificate is obtained after the TEE encrypts service data by using the predetermined channel key, and the channel key is obtained by the authentication server and the TEE through negotiation in advance. Certainly, or the TEE can encrypt the service encryption key and the device identity certificate together by using the channel key.

Further, before the sending device authentication information to an authentication server through a secure channel with the authentication server, the key management method in this embodiment further includes: sending second authentication information to the authentication server, where the second authentication information is used to represent an identity of the TEE, and the second authentication information is used by the authentication server to perform identity authentication on the TEE; receiving first authentication information sent by the authentication server, and performing identity authentication on the authentication server based on the first authentication information, where the first authentication information is used to represent an identity of the authentication server; and after determining that the authentication server passes identity authentication, determining the channel key through negotiation with the authentication server in a handshake manner.

For specific implementation of steps in S502 and S504, refer to specific implementation of corresponding steps in the embodiment shown in FIG. 2. Details are omitted here for simplicity.

Figure 6A:
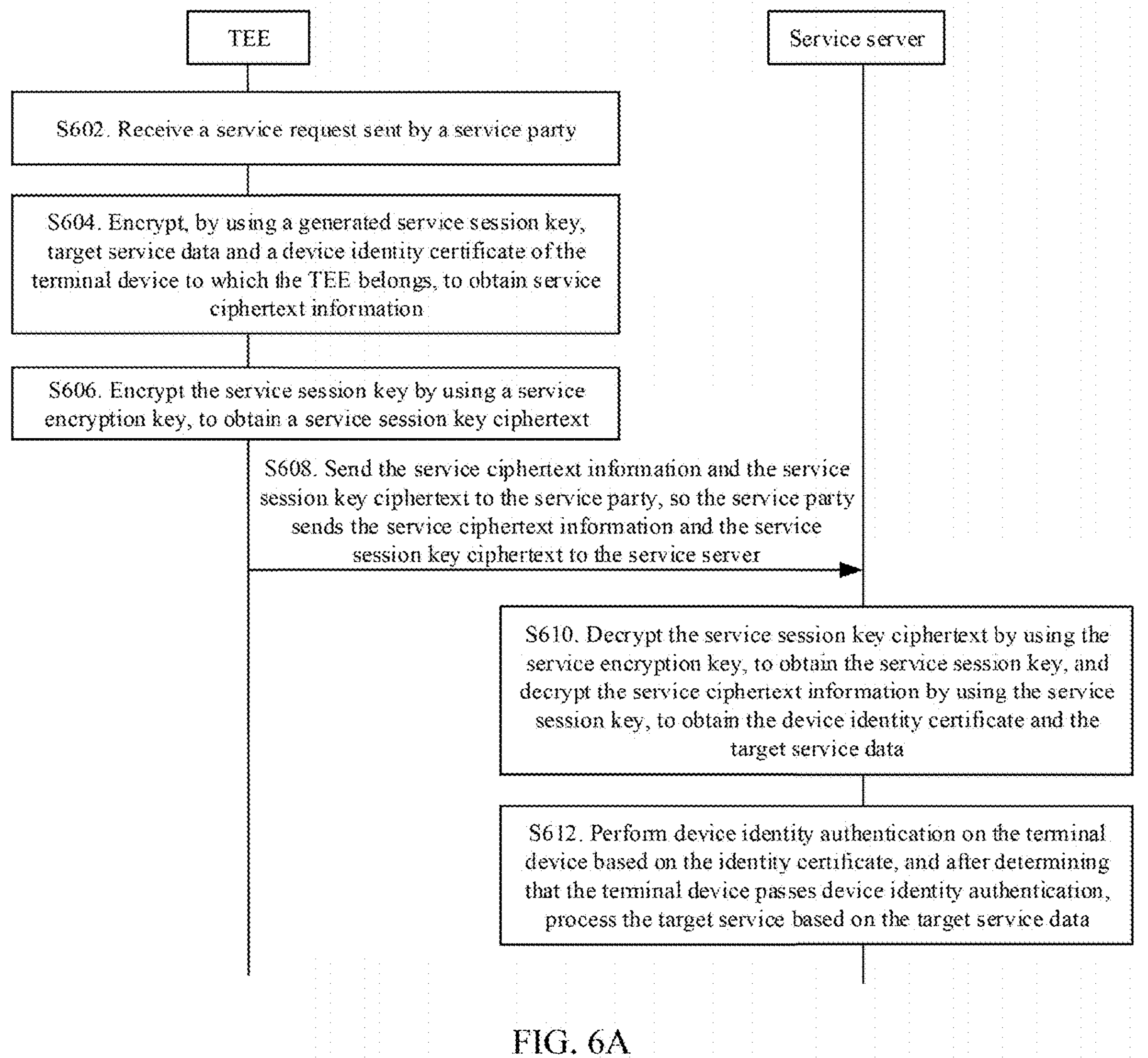
FIG. 6A is a schematic flowchart 1 illustrating a service processing method, according to one or more embodiments of this specification.

Based on the system architecture shown in FIG. 1, an embodiment of this specification further provides a service processing method. Referring to FIG. 6A, FIG. 6A is a schematic flowchart illustrating a service processing method, according to one or more embodiments of this specification. The figure describes a specific implementation of interaction between a TEE and a service server. As shown in FIG. 6A, the method can include the following steps.

S602. The TEE receives a service request sent by the service party.

The service request is sent when the service party receives a service processing request for a target service from a target user. The service party can be an application that is in a terminal device to which the TEE belongs and that can provide a service for a user, for example, an RA running in an REE, or can be a party that provides a service for a user and processes a service requested by the user, for example, a financial institution. The target user can be any user. In this embodiment of this specification, the target user can be a user that initiates a specified service. The target service can be a service requested by a user. In practice, the target service can include a plurality of types, for example, a payment service and a privacy risk control service. A user identifier of the target user can be a name, an identity card number, an account number, etc. of the target user, or can be information that can uniquely determine an identity of the target user and that can be calculated based on one or more types of above-mentioned information.

S604. The TEE encrypts, by using a generated service session key, target service data and a device identity certificate of the terminal device to which the TEE belongs, to obtain service ciphertext information.

The target service data are service data required for processing the target service. The device identity certificate is used to prove that the terminal device is authentic and trustworthy. A service encryption key and the device identity certificate are sent by the authentication server to the TEE through a secure channel between the authentication server and the TEE after determining, based on device authentication information sent by the TEE, that the terminal device passes device authentication. The device authentication information is sent by the TEE to the authentication server through the secure channel, and the device authentication information is information used to prove an identity of the terminal device to which the TEE belongs.

Figure 6B:
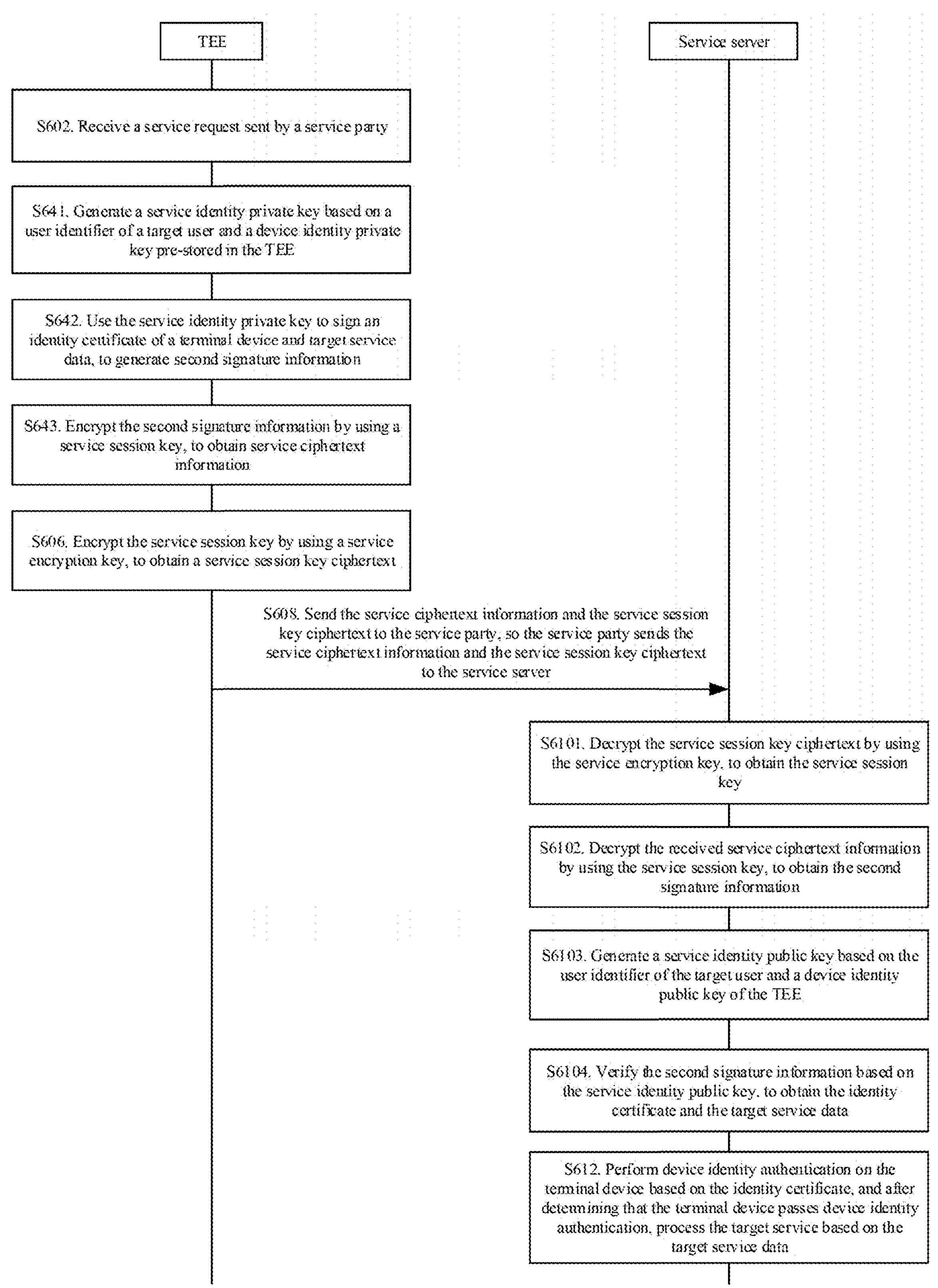
FIG. 6B is a schematic flowchart 2 illustrating a service processing method, according to one or more embodiments of this specification.

To ensure integrity, security, and validity of the device identity certificate and the target service data that are transmitted to the service server, in an optional implementation, as shown in FIG. 6B, S604 can include the following steps: S641. The TEE generates a service identity private key based on the user identifier of the target user and a device identity private key pre-stored in the TEE; S642. The TEE signs the device identity certificate of the terminal device and the target service data by using the service identity private key, to generate second signature information; and S643. The TEE encrypts the second signature information by using the service encryption key, to obtain the service ciphertext information.

S606. The TEE encrypts the service session key by using the service encryption key, to obtain a service session key ciphertext.

S608. The TEE sends the service ciphertext information and the service session key ciphertext to the service party, so the service party sends the service ciphertext information and the service session key ciphertext to the service server.

It can be understood that the service data and the device identity certificate are encrypted by using both the service session key and the service encryption key, so security of the service data and the device identity certificate in a transmission process can be further provided.

Further, the TEE can return, to the service party, a key identifier of the service encryption key used for encryption, and the service party sends the key identifier to the service server. Correspondingly, after receiving the key identifier, the service server can determine a service encryption key to be used based on the key identifier, and decrypt the service session key ciphertext by using the service encryption key, to obtain the service session key.

S610. The service server decrypts the service session key ciphertext by using the service encryption key, to obtain the service session key, and decrypts the service ciphertext information by using the service session key, to obtain the device identity certificate and the target service data.

To ensure integrity, security, and validity of the device identity certificate and the target service data that are transmitted to the service server, in an optional implementation, the service ciphertext information is obtained by the TEE by signing the second signature information by using the service encryption key, and the second signature information is obtained by the TEE by signing the device identity certificate of the terminal device and the target service data by using the service identity private key. In this case, as shown in FIG. 6B, S610 can include: S6101. The service server decrypts the service session key ciphertext by using the service encryption key, to obtain the service session key; S6102. The service server decrypts the received service ciphertext information by using the service session key, to obtain the second signature information; S6103. The service server generates a service identity public key based on the user identifier of the target user and a device identity public key of the TEE; and S6104. The service server verifies the second signature information based on the service identity public key, to obtain the device identity certificate and the target service data.

S612. The service server performs device identity authentication on the terminal device based on the device identity certificate, and after determining that the terminal device passes device identity authentication, processes the target service based on the target service data.

For example, the service server can obtain, from the authentication server, the device identity certificate of the terminal device to which the TEE belongs, and compare the device identity certificate with the received device identity certificate; and if they are consistent after comparison, can determine that the terminal device to which the TEE belongs passes device identity authentication. The above-mentioned device identity authentication process for the terminal device is merely an example for description. In practice, there can be another implementation, provided that it is ensured that the service server can perform device identity authentication on the terminal device based on the device identity certificate.

Based on the service processing method provided in this embodiment of this specification, service ciphertext information obtained after a TEE encrypts, based on a service request of a service party and by using a stored service session key, a device identity certificate of a terminal device to which the TEE belongs and service data required for performing service processing is sent by the service method to a service server, which can ensure security of the device identity certificate and a service data transmission process. The TEE further encrypts the service session key by using a service encryption key, and then the service party sends the encrypted service session key to the service server, which can ensure that the service session key is not leaked. The service server first decrypts the encrypted service session key by using the service encryption key, to obtain the service session key, then decrypts the service ciphertext information by using the service session key, to obtain the device identity certificate and the service data, further performs, based on the device identity certificate, device identity authentication on the terminal device to which the TEE belongs, and after determining that device identity authentication succeeds, that is, after determining that the terminal device to which the TEE belongs is authentic and trustworthy, performs service processing based on the service data, which can ensure security and reliability of a service processing process. In addition, the service encryption key and the device identity certificate are deployed in the TEE by the authentication server by using a security capability of the TEE. Specifically, a secure channel is established between an authentication server and the TEE by using the security capability of the TEE, and the TEE sends, to the authentication server through the secure channel, device authentication information that can prove an identity of a terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel, so the TEE can encrypt and store, by using the service encryption key, a service session key used to encrypt service data. As such, not only the service session key is prevented from being leaked, but also security, confidentiality, and integrity of the service encryption key and the service session key are ensured by using a storage environment that is provided by the TEE and that is isolated from another execution environment, thereby improving security in a service data transmission and processing process. In addition, after determining that the terminal device to which the TEE belongs passes device authentication, the authentication server further sends, to the TEE through the secure channel, a device identity certificate used to verify that the terminal device is authentic and trustworthy, so in a process in which the TEE interacts with a service party, the TEE can further prove, by using the device identity certificate, that the terminal device to which the TEE belongs is trustworthy, and security of a service processing process is further improved. In addition, the service encryption key and the device identity certificate are delivered by the authentication server to the TEE through the secure channel between the authentication server and the TEE when determining that the terminal device to which the TEE belongs passes device authentication. As such, a complete key trust system is formed between the authentication server and the TEE, so as to ensure that the service encryption key deployed by the authentication server in the TEE is secure and valid. In addition, the service encryption key and the device identity certificate are sent to the TEE through the secure channel, so as to avoid leakage of the service encryption key and the device identity certificate in a transmission process, thereby further ensuring security in a subsequent service data transmission and processing process.

Figure 7:
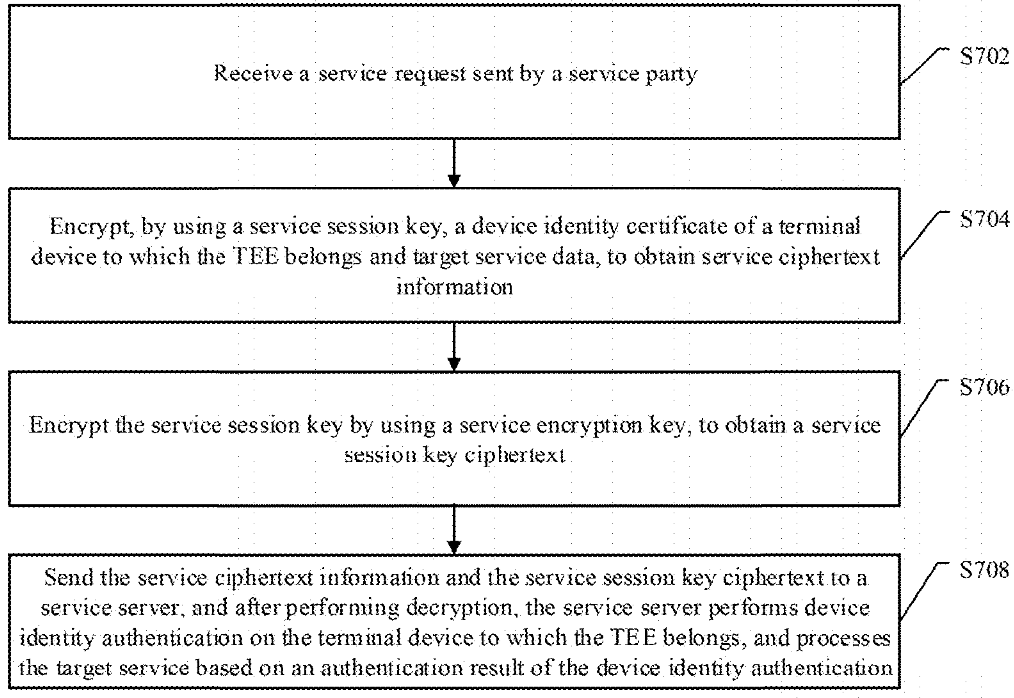
FIG. 7 is a schematic flowchart 3 illustrating a service processing method, according to one or more embodiments of this specification.

FIG. 7 is a schematic flowchart illustrating a service processing method, according to one or more embodiments of this specification. The service processing method shown in FIG. 7 can be executed by the TEE in the terminal device 1 shown in FIG. 1. The method can include the following steps:

S702. Receive a service request sent by a service party.

The service request is sent when the service party receives a service processing request for a target service from a target user.

S704. Encrypt, by using a service session key, a device identity certificate of a terminal device to which the TEE belongs and target service data, to obtain service ciphertext information.

The target service data are service data required for processing the target service. The device identity certificate is used to prove that the terminal device to which the TEE belongs is authentic and trustworthy. The device identity certificate is sent by an authentication server to the TEE through a secure channel between the authentication server and the TEE after determining, based on device authentication information sent by the TEE, that the terminal device to which the TEE belongs passes device authentication. The device authentication information is sent by the TEE to the authentication server through the secure channel, and the device authentication information is information used to prove an identity of the terminal device to which the TEE belongs.

In an optional implementation, S704 includes: generating a service identity private key based on a user identifier of the target user and a device identity private key pre-stored in the TEE, where the service request carries the user identifier of the target user; and signing the device identity certificate of the terminal device and the target service data by using the service identity private key, to generate second signature information, and encrypting the second signature information by using the service session key, to obtain the service ciphertext information.

S706. Encrypt the service session key by using a service encryption key, to obtain a service session key ciphertext.

The service encryption key is sent by an authentication server to the TEE through a secure channel between the authentication server and the TEE after determining, based on device authentication information sent by the TEE, that the terminal device to which the TEE belongs passes device authentication.

S708. Send the service ciphertext information and the service session key ciphertext to the service party, so the service party sends the service ciphertext information to a service server, and after performing decryption, the service server performs device identity authentication on the terminal device to which the TEE belongs, and processes the target service based on an authentication result of the device identity authentication.

For specific implementation of steps in S702 to S708, refer to specific implementation of corresponding steps in the embodiments shown in FIG. 6A and FIG. 6B. Details are omitted here for simplicity.

Figures 8, 9:
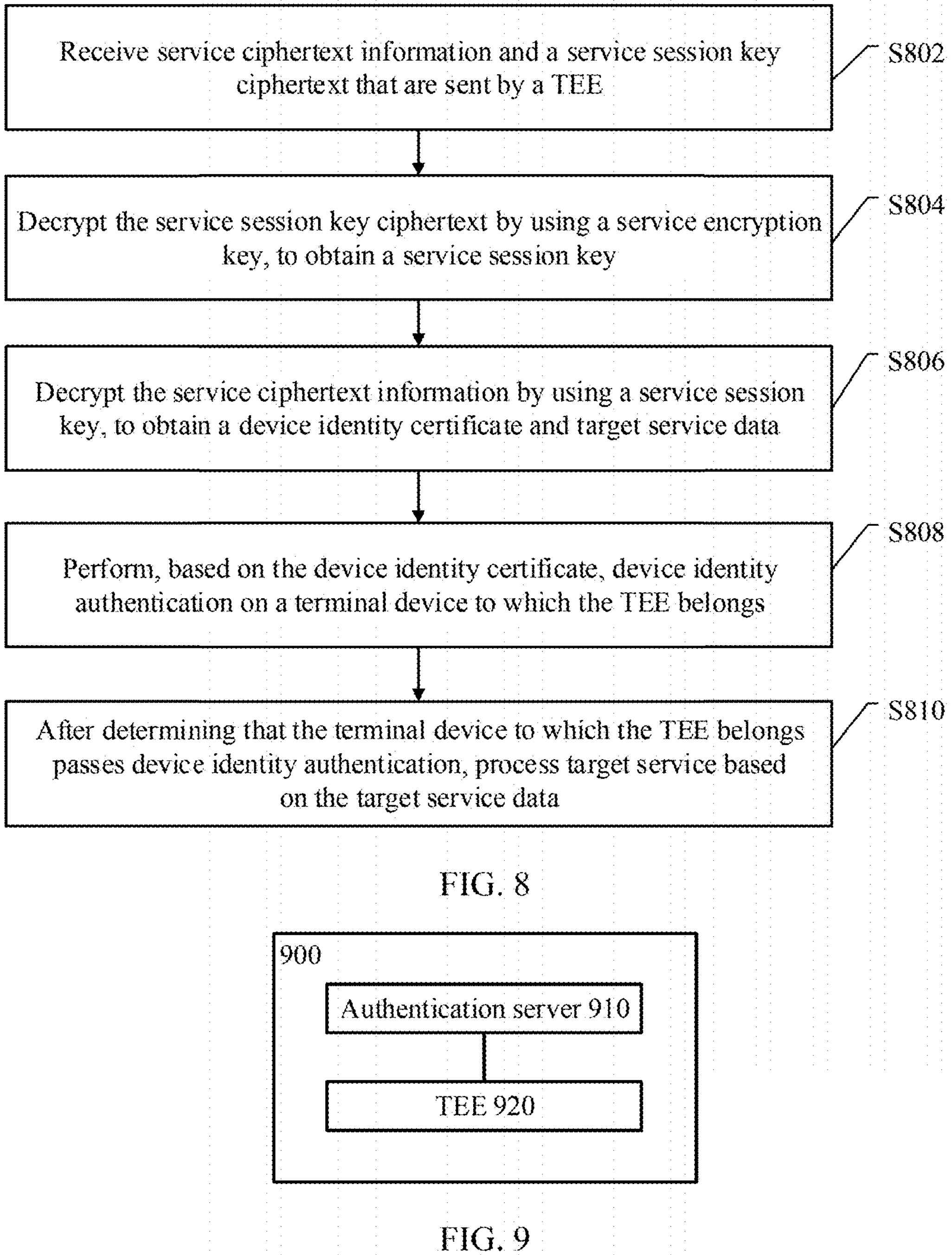
FIG. 8 is a schematic flowchart 4 illustrating a service processing method, according to one or more embodiments of this specification.
FIG. 9 is a schematic structural diagram illustrating a key management system, according to one or more embodiments of this specification.

FIG. 8 is a schematic flowchart illustrating a service processing method, according to one or more embodiments of this specification. The service processing method shown in FIG. 8 can be executed by the service server 3 shown in FIG. 1. The method can include the following steps: S802. Receive service ciphertext information and a service session key ciphertext that are sent by a TEE.

The service ciphertext information is obtained after the TEE encrypts, by using a service session key, a device identity certificate of a terminal device to which the TEE belongs and target service data. The service session key ciphertext is obtained by the TEE by encrypting a service session key by using a service encryption key.

The target service data are service data required for processing target service. The device identity certificate is used to prove that the terminal device to which the TEE belongs is authentic and trustworthy. The service encryption key and the device identity certificate are sent by an authentication server to the TEE through a secure channel between the authentication server and the TEE after determining, based on device authentication information sent by the TEE, that the terminal device to which the TEE belongs passes identity authentication. The device authentication information is sent by the TEE to the authentication server through the secure channel with the authentication server, and the device authentication information is information used to prove an identity of the terminal device to which the TEE belongs.

S804. Decrypt the service session key ciphertext by using the service encryption key, to obtain the service session key.

S806. Decrypt the service ciphertext information by using the service session key, to obtain the device identity certificate and the target service data.

In an optional implementation, the service ciphertext information is obtained by the TEE by signing second signature information by using the service session key, and the second signature information is obtained by the TEE by signing the device identity certificate of the terminal device to which the TEE belongs and the target service data by using a service identity private key. Correspondingly, S806 includes: decrypting the service ciphertext information by using the service session key, to obtain the second signature information; and generating a service identity public key based on a user identifier of a target user and a device identity public key of the TEE, and verifying the second signature information based on the service identity public key, to obtain the device identity certificate and the target service data.

S808. Perform, based on the device identity certificate, device identity authentication on the terminal device to which the TEE belongs.

S810. After determining that the terminal device to which the TEE belongs passes device identity authentication, process the target service based on the target service data.

For specific implementation of steps in S802 to S810, refer to specific implementation of corresponding steps in the embodiments shown in FIG. 6A and FIG. 6B. Details are omitted here for simplicity.

FIG. 9 is a schematic structural diagram illustrating a key management system 900, according to one or more embodiments of this specification. Referring to FIG. 9, the key management system 900 shown in FIG. 9 can include an authentication server 910 and a TEE 920. The TEE 920 sends device authentication information to the authentication server 910 through a secure channel between the TEE 920 and the authentication server 910. The device authentication information is information used to prove an identity of a terminal device to which the TEE 920 belongs.

The authentication server 910 performs, based on the device authentication information, device authentication on the terminal device to which the TEE 920 belongs; and after determining that the terminal device to which the TEE 920 belongs passes device authentication, the authentication server 910 sends a service encryption key and a device identity certificate to the TEE 920 through the secure channel. The service encryption key is used to encrypt and decrypt a service session key for encrypting service data, and the device identity certificate is used to verify that the terminal device is authentic and trustworthy.

In this embodiment, the authentication server 910 can implement functions implemented by the authentication server in the embodiments shown in FIG. 2 to FIG. 5, and the TEE 920 can implement functions implemented by the TEE in the embodiments shown in FIG. 2 to FIG. 5. For a specific implementation, refer to specific implementation of corresponding steps in the embodiments shown in FIG. 2 to FIG. 5. Details are omitted here for simplicity.

Figure 10:
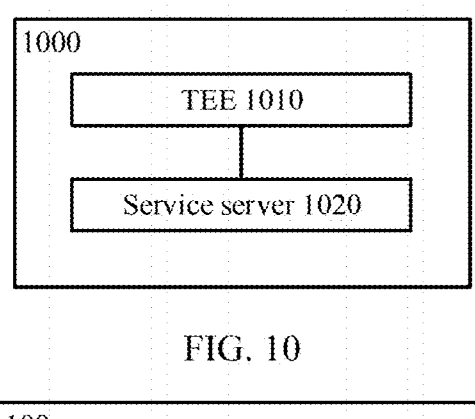
FIG. 10 is a schematic structural diagram illustrating a service processing system, according to one or more embodiments of this specification.

FIG. 10 is a schematic structural diagram illustrating a service processing system 1000, according to one or more embodiments of this specification. Referring to FIG. 10, the service processing system 1000 shown in FIG. 10 can include a TEE 1010 and a service server 1020. The TEE 1010 receives a service request sent by a service party, where the service request is sent when the service party receives a service processing request for a target service from a target user; the TEE 1010 encrypts, by using a generated service session key, a device identity certificate of a terminal device to which the TEE belongs and target service data, to obtain service ciphertext information, and encrypts the service session key by using a service encryption key, to obtain a service session key ciphertext, where the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; the TEE 1010 sends the service ciphertext information and the service session key ciphertext to the service party, so the service party sends the service ciphertext information and the service session key ciphertext to the service server 1020, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; the service server 1020 decrypts the service session key ciphertext by using the service encryption key, to obtain the service session key, and decrypts the service ciphertext information by using the service session key, to obtain the device identity certificate and the target service data; and the service server 1020 performs device identity authentication on the terminal device based on the device identity certificate, and after determining that the terminal device passes device identity authentication, processes the target service based on the target service data.

In this embodiment, the TEE 1010 can implement functions implemented by the TEE in the embodiments shown in FIG. 6A to FIG. 8, and the service server 1020 can implement functions implemented by the service server in the embodiments shown in FIG. 6A to FIG. 8. For specific implementation, refer to specific implementation of corresponding steps in the embodiments shown in FIG. 6A to FIG. 8.

Figure 11:
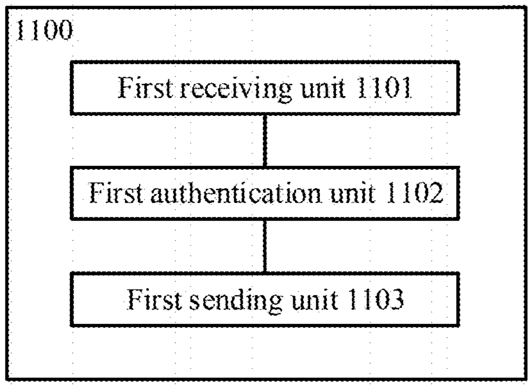
FIG. 11 is a schematic structural diagram 1 illustrating a key management apparatus, according to one or more embodiments of this specification.

In addition, corresponding to the above-mentioned key management method shown in FIG. 4, an embodiment of this specification further provides a key management apparatus, and the key management apparatus can be applied to an authentication server. FIG. 11 is a schematic structural diagram illustrating a key management apparatus 1100, according to one or more embodiments of this specification, including: a first receiving unit 1101, configured to receive, through a secure channel with a TEE, device authentication information sent by the TEE, where the device authentication information is stored in the TEE, and the device authentication information is information used to prove an identity of a terminal device to which the TEE belongs; a first authentication unit 1102, configured to perform, based on the device authentication information, device authentication on the terminal device to which the TEE belongs; and a first sending unit 1103, configured to: send, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

Based on the key management apparatus provided in this embodiment of this specification, a secure channel is established between an authentication server and a TEE by using a security capability of the TEE, and the TEE sends, to the authentication server through the secure channel, device authentication information that can prove an identity of a terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel, so the TEE can encrypt and store, by using the service encryption key, a service session key used to encrypt service data. As such, not only the service session key is prevented from being leaked, but also security, confidentiality, and integrity of the service encryption key and the service session key are ensured by using a storage environment that is provided by the TEE and that is isolated from another execution environment, thereby improving security in a service data transmission and processing process. In addition, after determining that the terminal device to which the TEE belongs passes device authentication, the authentication server further sends, to the TEE through the secure channel, a device identity certificate used to verify that the terminal device is authentic and trustworthy, so in a process in which the TEE interacts with a service party, the TEE can further prove, by using the device identity certificate, that the terminal device to which the TEE belongs is trustworthy, and security of a service processing process is further improved. In addition, the service encryption key and the device identity certificate are delivered by the authentication server to the TEE through the secure channel between the authentication server and the TEE when determining that the terminal device to which the TEE belongs passes device authentication. As such, a complete key trust system is formed between the authentication server and the TEE, so as to ensure that the service encryption key deployed by the authentication server in the TEE is secure and valid. In addition, the service encryption key and the device identity certificate are sent to the TEE through the secure channel, so as to avoid leakage of the service encryption key and the device identity certificate in a transmission process, thereby further ensuring security in a subsequent service data transmission and processing process.

That the first authentication unit 1102 performs, based on the device authentication information, device authentication on the terminal device to which the TEE belongs can include: decrypting the device authentication information by using a channel key, to obtain a device certificate of the terminal device, where the channel key is determined through negotiation with the TEE in advance, the device authentication information is obtained after the TEE encrypts the device certificate of the terminal device based on the channel key, and the device certificate is pre-stored in the TEE; and performing device authentication on the terminal device based on the device certificate of the terminal device.

Optionally, that the first authentication unit 1102 performs, based on the device authentication information, device authentication on the terminal device to which the TEE belongs includes: decrypting the device authentication information by using the channel key, to obtain the device certificate of the terminal device and first signature information, where the device authentication information is obtained after the TEE encrypts, by using the channel key, the device certificate of the terminal device to which the TEE belongs and the first signature information, and the first signature information is obtained after the TEE signs a challenge code from the authentication server; verifying the first signature information; after determining that the verification succeeds, comparing a challenge code in the first signature information with a locally stored challenge code; and when the challenge code in the first signature information is consistent with the locally stored challenge code after comparison, performing device authentication on the terminal device based on the device certificate of the terminal device.

Optionally, that the first sending unit 1103 sends the service encryption key and the device identity certificate to the TEE through the secure channel after determining that the terminal device passes device authentication includes: encrypting the service encryption key and the device identity certificate by using a predetermined channel key, to obtain an encrypted service encryption key and an encrypted device identity certificate, where the channel key is determined by the authentication server and the TEE through negotiation in advance; and sending the encrypted service encryption key and the encrypted device identity certificate to the TEE, so the TEE performs decryption by using the channel key to obtain the service encryption key and the device identity certificate.

Optionally, before the first receiving unit 1101 receives, through the secure channel with the TEE, the device authentication information sent by the TEE, the first sending unit 1103 further sends first authentication information to the TEE, where the first authentication information is used to represent an identity of the authentication server, and the first authentication information is used by the TEE to perform identity authentication on the authentication server. Before receiving, through the secure channel with the TEE, the device authentication information sent by the TEE, the first receiving unit 1101 further receives second authentication information sent by the TEE, and performs identity authentication on the TEE based on the second authentication information, where the second authentication information is used to represent an identity of the TEE. The key management apparatus 1100 further includes a first negotiation unit, configured to: after determining that the TEE passes identity authentication, determine the channel key through negotiation with the TEE in a handshake manner.

Optionally, different services are corresponding to different service encryption keys, and the service encryption key is used to encrypt and decrypt a service session key of a corresponding service.

The key management apparatus in this embodiment of this specification can be used as an execution body of the above-mentioned key management method shown in FIG. 4, and therefore, functions implemented in the key management method in FIG. 4 can be implemented. Because principles are the same, details are omitted here.

Figure 12:
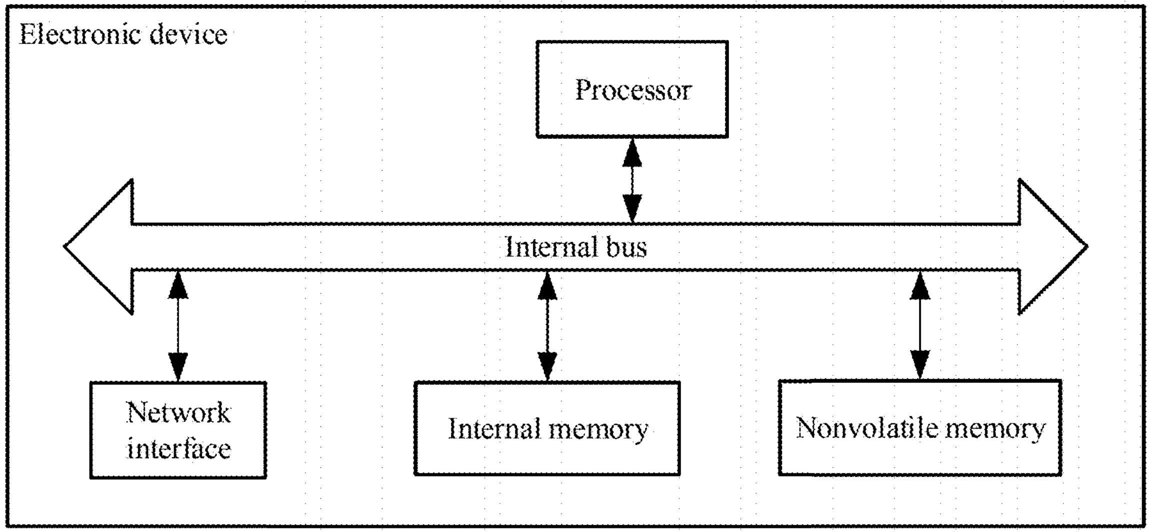
FIG. 12 is a schematic structural diagram 1 illustrating an electronic device, according to one or more embodiments of this specification.

FIG. 12 is a schematic structural diagram illustrating an electronic device, according to one or more embodiments of this specification. Referring to FIG. 12, in terms of hardware, the electronic device includes a processor, and optionally, further includes an internal bus, a network interface, and a memory. The memory may include an internal memory, for example, a random access memory (RAM), or may further include a nonvolatile memory, for example, at least one disk memory. Certainly, the electronic device may further include hardware needed by another service.

The processor, the network interface, and the memory can be connected to each other through the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For ease of representation, in FIG. 12, only one two-way arrow is used to represent the bus, but it does not indicate that there is only one bus or only one type of bus.

The memory is configured to store a program. Specifically, the program can include program code, and the program code includes computer operation instructions. The memory can include the internal memory and the nonvolatile memory and provide instructions and data for the processor.

The processor reads a corresponding computer program from the nonvolatile memory to the internal memory for running, and a key management apparatus is logically formed. The processor executes the program stored in the memory, and is configured to perform the following operations: receiving, through a secure channel with a TEE, device authentication information sent by the TEE, where the device authentication information is stored in the TEE, and the device authentication information is information used to prove an identity of a terminal device to which the TEE belongs; performing, based on the device authentication information, device authentication on the terminal device to which the TEE belongs; and sending, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

The method performed by the key management apparatus disclosed in the embodiment shown in FIG. 4 in this specification can be applied to a processor, or can be implemented by a processor. The processor may be an integrated circuit chip with a signal processing capability. In an implementation process, each step of the above-mentioned method can be completed by an integrated logic circuit of hardware in the processor or instructions in a form of software. The above-mentioned processor can be a general-purpose processor, including a central processing unit (CPU), a network processor (NP), etc., or can be a digital signal processor (DSP), an application-specific integrated circuit (ASIC), a field-programmable gate array (FPGA) or another programmable logic device, a discrete gate or a transistor logic device, and a discrete hardware component. The disclosed methods, steps, and logical block diagrams in the embodiments of this specification can be implemented or performed. The general-purpose processor can be a microprocessor, or the processor can be any conventional processor, etc. The steps of the methods disclosed with reference to the embodiments of this specification can be directly performed by a hardware decoding processor or performed by a combination of hardware and software modules in a decoding processor. The software module can be located in a storage medium mature in the art, for example, an RAM, a flash memory, a read-only memory, a programmable read-only memory or an electrically crasable programmable memory, or a register. The storage medium is located in the memory, and the processor reads information in the memory and completes the steps of the previously described methods by using hardware of the processor.

It should be understood that the electronic device in this embodiment of this specification can implement functions of the key management apparatus in the embodiment shown in FIG. 4. Because principles are the same, details are omitted in this embodiment of this specification.

Certainly, in addition to software implementations, the electronic device in this specification does not exclude other implementations, for example, a logic device or a combination of hardware and software. In other words, an execution body of the following processing process is not limited to logical units, and can be hardware or a logic device.

An embodiment of this specification further provides a computer readable storage medium. The computer readable storage medium stores one or more programs. The one or more programs include an instruction. When the instruction is being executed by a portable electronic device including a plurality of applications, the portable electronic device can execute the method in the embodiment shown in FIG. 4, and is specifically configured to perform the following operations: receiving, through a secure channel with a TEE, device authentication information sent by the TEE, where the device authentication information is stored in the TEE, and the device authentication information is information used to prove an identity of a terminal device to which the TEE belongs; performing, based on the device authentication information, device authentication on the terminal device to which the TEE belongs; and sending, after determining that the terminal device passes device authentication, a service encryption key and a device identity certificate to the TEE through the secure channel, where the service encryption key is used to encrypt and decrypt a service session key for encrypting service data, and the device identity certificate is used to verify that the terminal device is authentic and trustworthy.

In addition, corresponding to the above-mentioned key management method shown in FIG. 5, an embodiment of this specification further provides a key management apparatus, and the key management apparatus can be applied to a TEE. FIG. 13 is a schematic structural diagram illustrating a key management apparatus 1300, according to one or more embodiments of this specification, including: a second sending unit 1301, configured to send device authentication information to an authentication server through a secure channel with the authentication server, where the device authentication information is information used to prove an identity of a terminal device to which the TEE belongs, and the device authentication information is used by the authentication server to perform device authentication on the terminal device; and a second receiving unit 1302, configured to receive, through the secure channel, a service encryption key and a device identity certificate that are sent by the authentication server, where the service encryption key is used to encrypt and decrypt a service session key for encrypting service data, the device identity certificate is used to verify that the terminal device is authentic and trustworthy, and the service encryption key is sent by the authentication server after determining that the terminal device passes device authentication.

Based on the key management apparatus provided in this embodiment of this specification, a secure channel is established between an authentication server and a TEE by using a security capability of the TEE, and the TEE sends, to the authentication server through the secure channel, device authentication information that can prove an identity of a terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel, so the TEE can encrypt and store, by using the service encryption key, a service session key used to encrypt service data. As such, not only the service session key is prevented from being leaked, but also security, confidentiality, and integrity of the service encryption key and the service session key are ensured by using a storage environment that is provided by the TEE and that is isolated from another execution environment, thereby improving security in a service data transmission and processing process. In addition, after determining that the terminal device to which the TEE belongs passes device authentication, the authentication server further sends, to the TEE through the secure channel, a device identity certificate used to verify that the terminal device is authentic and trustworthy, so in a process in which the TEE interacts with a service party, the TEE can further prove, by using the device identity certificate, that the terminal device to which the TEE belongs is trustworthy, and security of a service processing process is further improved. In addition, the service encryption key and the device identity certificate are delivered by the authentication server to the TEE through the secure channel between the authentication server and the TEE when determining that the terminal device to which the TEE belongs passes device authentication. As such, a complete key trust system is formed between the authentication server and the TEE, so as to ensure that the service encryption key deployed by the authentication server in the TEE is secure and valid. In addition, the service encryption key and the device identity certificate are sent to the TEE through the secure channel, so as to avoid leakage of the service encryption key and the device identity certificate in a transmission process, thereby further ensuring security in a subsequent service data transmission and processing process.

Optionally, that the second sending unit 1301 sends the device authentication information to the authentication server through the secure channel with the authentication server includes: encrypting a device certificate of the terminal device based on a predetermined channel key, to obtain the device authentication information, where the device certificate is pre-stored in the TEE, and the channel key is determined by the TEE and the authentication server through negotiation in advance; and sending the device authentication information to the authentication server.

Optionally, that the second sending unit 1301 encrypts the device certificate of the terminal device based on the predetermined channel key, to obtain the device authentication information includes: signing a challenge code from the authentication server to obtain first signature information; and encrypting the device certificate of the terminal device and the first signature information by using the channel key, to obtain the device authentication information.

Optionally, before sending the device authentication information to the authentication server through the secure channel with the authentication server, the second receiving unit 1302 further receives first authentication information sent by the authentication server, performs identity authentication on the authentication server based on the first authentication information, and determines that the authentication server passes identity authentication, where the first authentication information is used to represent an identity of the authentication server. The second sending unit 1301 further sends second authentication information to the authentication server before sending the device authentication information to the authentication server through the secure channel with the authentication server, where the second authentication information is used to represent an identity of the TEE, and the second authentication information is used by the authentication server to perform identity authentication on the TEE. The key management apparatus 1300 further includes: a second negotiation unit, configured to determine the channel key through negotiation with the authentication server in a handshake manner.

Optionally, different services are corresponding to different service encryption keys, and the service encryption key is used to encrypt and decrypt a service session key of a corresponding service.

The key management apparatus in this embodiment of this specification can be used as an execution body of the above-mentioned key management method shown in FIG. 5, and therefore, functions implemented in the key management method in FIG. 5 can be implemented. Because principles are the same, details are omitted here.

In addition, corresponding to the service processing method shown in FIG. 7, an embodiment of this specification further provides a service processing apparatus, and the service processing apparatus can be applied to a TEE. FIG. 14 is a schematic structural diagram illustrating a service processing apparatus 1400, according to one or more embodiments of this specification, including: a third receiving unit 1401, configured to receive a service request sent by a service party, where the service request is sent when the service party receives a service processing request for a target service from a target user; a first encryption unit 1402, configured to: encrypt, by using a generated service session key, target service data and a device identity certificate of a terminal device to which the TEE belongs, to obtain service ciphertext information, and encrypt the service session key by using a service encryption key, to obtain a service session key ciphertext, where the target service data are service data required for processing the target service; and a third sending unit 1403, configured to send the service ciphertext information and the service session key ciphertext to the service party, so the service party sends the service ciphertext information and the service session key to a service server, and the service server performs device identity authentication on the terminal device after performing decryption, and processes the target service based on an authentication result of the device identity authentication, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device.

Based on the service processing apparatus provided in this embodiment of this specification, service ciphertext information obtained after a TEE encrypts, based on a service request of a service party and by using a stored service session key, a device identity certificate of a terminal device to which the TEE belongs and service data required for performing service processing is sent by the service method to a service server, which can ensure security of the device identity certificate and a service data transmission process. The TEE further encrypts the service session key by using a service encryption key, and then the service party sends the encrypted service session key to the service server, which can ensure that the service session key is not leaked. After obtaining the device identity certificate and the service data through decryption, the service server first decrypts the encrypted service session key based on the service encryption key, to obtain the service session key, then decrypts the service ciphertext information by using the service session key, to obtain the target service data and the device certificate of the terminal device to which the TEE belongs, further performs, based on the device identity certificate, device identity authentication on the terminal device to which the TEE belongs, and after determining that device identity authentication succeeds, that is, after determining that the terminal device to which the TEE belongs is authentic and trustworthy, performs service processing based on the service data, which can ensure security and reliability of a service processing process. In addition, the service encryption key is deployed in the TEE by the authentication server by using a security capability of the TEE. Specifically, a secure channel is established between an authentication server and the TEE by using the security capability of the TEE, and the TEE sends, to the authentication server through the secure channel, device authentication information that can prove an identity of the terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel. As such, a complete key trust system is formed between the authentication server and the TEE, to ensure that the service encryption key deployed in the TEE by the authentication server is secure and valid, and the service encryption key is sent to the TEE through the secure channel, so the service encryption key can be prevented from being leaked in the transmission process. In addition, the TEE can provide a storage environment isolated from another execution environment for the service encryption key, to ensure security, confidentiality, and integrity of the service encryption key, and further ensure security of service data transmission and processing.

Optionally, that the first encryption unit 1402 encrypts, by using the service session key, the device identity certificate of the terminal device to which the TEE belongs and the target service data includes:

- generating a service identity private key based on a user identifier of the target user and a device identity private key pre-stored in the TEE, where the service request carries the user identifier of the target user; and
- signing the device identity certificate of the terminal device and the target service data by using the service identity private key, to generate second signature information, and encrypting the second signature information by using the service session key, to obtain the service ciphertext information.

The service processing apparatus in this embodiment of this specification can be used as an execution body of the service processing method shown in FIG. 7. Therefore, functions implemented in the service processing method in FIG. 7 can be implemented. Because principles are the same, details are omitted here.

FIG. 15 is a schematic diagram illustrating a structure of an electronic device, according to one or more embodiments of this specification. Referring to FIG. 15, in terms of hardware, the electronic device includes a processor, and optionally, further includes an internal bus, a network interface, and a memory. The memory may include an internal memory, for example, a random access memory (RAM), or may further include a nonvolatile memory, for example, at least one disk memory. Certainly, the electronic device may further include hardware needed by another service.

The processor, the network interface, and the memory can be connected to each other through the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For ease of representation, in FIG. 15, only one two-way arrow is used to represent the bus, but it does not indicate that there is only one bus or only one type of bus.

The memory is configured to store a program. Specifically, the program can include program code, and the program code includes computer operation instructions. The memory can include the internal memory and the nonvolatile memory and provide instructions and data for the processor.

The processor reads a corresponding computer program from the nonvolatile memory to the internal memory for running, and a key management apparatus is logically formed. The processor executes the program stored in the memory, and is specifically configured to perform the following operations: sending device authentication information to an authentication server through a secure channel with the authentication server, where the device authentication information is information used to prove an identity of a terminal device to which the TEE belongs, and the device authentication information is used by the authentication server to perform device authentication on the terminal device; and receiving, through the secure channel, a service encryption key and a device identity certificate that are sent by the authentication server, where the service encryption key is used to encrypt and decrypt a service session key for encrypting service data, the device identity certificate is used to verify that the terminal device is authentic and trustworthy, and the service encryption key and the device identity certificate are sent by the authentication server after determining that the terminal device passes device authentication.

Or the processor reads a corresponding computer program from the non-volatile memory into the internal memory and then runs the computer program to logically form a service processing apparatus. The processor executes the program stored in the memory, and is specifically configured to perform the following operations: receiving a service request sent by a service party, where the service request is sent when the service party receives a service processing request for a target service from a target user; encrypting, by using a generated service session key, target service data and a device identity certificate of a terminal device to which the TEE belongs, to obtain service ciphertext information, where the target service data are service data required for processing the target service; encrypting the service session key by using a service encryption key, to obtain a service session key ciphertext, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; and sending the service ciphertext information and the service session key ciphertext to the service party, so the service party sends the service ciphertext information and the service session key ciphertext to a service server, and the service server performs device identity authentication on the terminal device after performing decryption and processes the target service based on an authentication result of the device identity authentication.

The above-mentioned method performed by the key management apparatus disclosed in the embodiment shown in FIG. 5 of this specification or the above-mentioned method performed by the service processing apparatus disclosed in the embodiment shown in FIG. 7 of this specification can be applied to a processor or implemented by a processor. The processor may be an integrated circuit chip with a signal processing capability. In an implementation process, each step of the above-mentioned method can be completed by an integrated logic circuit of hardware in the processor or instructions in a form of software. The above-mentioned processor can be a general-purpose processor, including a central processing unit (CPU), a network processor (NP), etc., or can be a digital signal processor (DSP), an application-specific integrated circuit (ASIC), a field-programmable gate array (FPGA) or another programmable logic device, a discrete gate or a transistor logic device, and a discrete hardware component. The disclosed methods, steps, and logical block diagrams in the embodiments of this specification can be implemented or performed. The general-purpose processor can be a microprocessor, or the processor can be any conventional processor, etc. The steps of the methods disclosed with reference to the embodiments of this specification can be directly performed by a hardware decoding processor or performed by a combination of hardware and software modules in a decoding processor. The software module can be located in a storage medium mature in the art, for example, an RAM, a flash memory, a read-only memory, a programmable read-only memory or an electrically crasable programmable memory, or a register. The storage medium is located in the memory, and the processor reads information in the memory and completes the steps of the previously described methods by using hardware of the processor.

It should be understood that the electronic device in this embodiment of this specification can implement functions of the key management apparatus in the embodiment shown in FIG. 5 or can implement functions of the service processing apparatus in the embodiment shown in FIG. 7. Because principles are the same, details are omitted in this embodiment of this specification.

Certainly, in addition to software implementations, the electronic device in this specification does not exclude other implementations, for example, a logic device or a combination of hardware and software. In other words, an execution body of the following processing process is not limited to logical units, and can be hardware or a logic device.

An embodiment of this specification further provides a computer readable storage medium. The computer readable storage medium stores one or more programs. The one or more programs include an instruction. When the instruction is being executed by a portable electronic device including a plurality of applications, the portable electronic device performs the method in the embodiment shown in FIG. 5, and is specifically configured to perform the following operations: sending device authentication information to an authentication server through a secure channel with the authentication server, where the device authentication information is information used to prove an identity of a terminal device to which a TEE belongs, and the device authentication information is used by the authentication server to perform device authentication on the terminal device; and receiving, through the secure channel, a service encryption key and a device identity certificate that are sent by the authentication server, where the service encryption key is used to encrypt and decrypt a service session key for encrypting service data, the device identity certificate is used to verify that the terminal device is authentic and trustworthy, and the service encryption key and the device identity certificate are sent by the authentication server after determining that the terminal device passes device authentication.

An embodiment of this specification further provides a computer readable storage medium. The computer readable storage medium stores one or more programs. The one or more programs include an instruction. When the instruction is being executed by a portable electronic device including a plurality of applications, the portable electronic device performs the method in the embodiment shown in FIG. 7, and is specifically configured to perform the following operations: receiving a service request sent by a service party, where the service request is sent when the service party receives a service processing request for a target service from a target user; encrypting, by using a generated service session key, target service data and a device identity certificate of a terminal device to which the TEE belongs, to obtain service ciphertext information, where the target service data are service data required for processing the target service; encrypting the service session key by using a service encryption key, to obtain a service session key ciphertext, where the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; and sending the service ciphertext information and the service session key ciphertext to the service party, so the service party sends the service ciphertext information and the service session key ciphertext to a service server, and the service server performs device identity authentication on the terminal device after performing decryption and processes the target service based on an authentication result of the device identity authentication.

Figure 16:
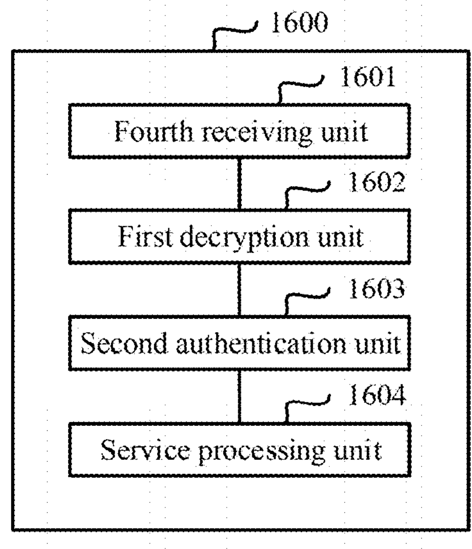
FIG. 16 is a schematic structural diagram 3 illustrating a service processing apparatus, according to one or more embodiments of this specification.

In addition, corresponding to the service processing method shown in FIG. 8, an embodiment of this specification further provides a service processing apparatus, and the service processing apparatus can be applied to a service server. FIG. 16 is a schematic structural diagram illustrating a service processing apparatus 1600, according to one or more embodiments of this specification, including: a fourth receiving unit 1601, configured to receive service ciphertext information and a service session key ciphertext that are sent by a service party, where the service ciphertext information and the service session key ciphertext are generated by a TEE in response to a non-service request of the service party and sent to the service party, the service ciphertext information is obtained after the TEE encrypts, by using a generated service session key, target service data and a device identity certificate of a terminal device to which the TEE belongs, the service session key ciphertext is obtained after the TEE encrypts the service session key by using a service encryption key, the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; a first decryption unit 1602, configured to: decrypt the service session key ciphertext by using the service encryption key, to obtain the service session key, and decrypt the service ciphertext information by using the service session key, to obtain the device identity certificate and the target service data; a second authentication unit 1603, configured to perform device identity authentication on the terminal device based on the device identity certificate; and a service processing unit 1604, configured to: after determining that the terminal device passes device identity authentication, process the target service based on the target service data.

Based on the service processing apparatus provided in this embodiment of this specification, service ciphertext information obtained after a TEE encrypts, based on a service request of a service party and by using a stored service session key, a device identity certificate of a terminal device to which the TEE belongs and service data required for performing service processing is sent by the service method to a service server, which can ensure security of the device identity certificate and a service data transmission process. The TEE further encrypts the service session key by using a service encryption key, and then the service party sends the encrypted service session key to the service server, which can ensure that the service session key is not leaked. After obtaining the device identity certificate and the service data through decryption, the service server first decrypts the encrypted service session key based on the service encryption key, to obtain the service session key, then decrypts the service ciphertext information by using the service session key, to obtain the target service data and the device identity certificate of the terminal device to which the TEE belongs, further performs, based on the device identity certificate, device identity authentication on the terminal device to which the TEE belongs, and after determining that device identity authentication succeeds, that is, after determining that the terminal device to which the TEE belongs is authentic and trustworthy, performs service processing based on the service data, which can ensure security and reliability of a service processing process. In addition, the service encryption key is deployed in the TEE by the authentication server by using a security capability of the TEE. Specifically, a secure channel is established between an authentication server and the TEE by using the security capability of the TEE, and the TEE sends, to the authentication server through the secure channel, device authentication information that can prove an identity of the terminal device to which the TEE belongs, to ensure that the device authentication information is not intercepted by outsiders in a transmission process. The authentication server performs, based on the received device authentication information, device authentication on the terminal device to which the TEE belongs. If the terminal device passes device authentication, it can be determined that the terminal device to which the TEE belongs is authentic and trustworthy. In this case, a service encryption key is sent to the TEE through the secure channel. As such, a complete key trust system is formed between the authentication server and the TEE, to ensure that the service encryption key deployed in the TEE by the authentication server is secure and valid, and the service encryption key is sent to the TEE through the secure channel, so the service encryption key can be prevented from being leaked in the transmission process. In addition, the TEE can provide a storage environment isolated from another execution environment for the service encryption key, to ensure security, confidentiality, and integrity of the service encryption key, and further ensure security of service data transmission and processing.

Optionally, that the first decryption unit 1602 decrypts the service ciphertext information by using the service session key includes: decrypting the service ciphertext information by using the service session key, to obtain the second signature information, where the service ciphertext information is obtained after the TEE encrypts second signature information by using the service session key, and the second signature information is obtained after the TEE signs, based on a service identity private key, the device identity certificate of the terminal device to which the TEE belongs and the target service data; and generating a service identity public key based on a user identifier of the target user and a device identity public key of the TEE, and verifying the second signature information based on the service identity public key, to obtain the device identity certificate and the target service data.

Clearly, the service processing apparatus in this embodiment of this specification can be used as an execution body of the service processing method shown in FIG. 8. Therefore, functions implemented in the service processing method in FIG. 8 can be implemented. Because principles are the same, details are omitted here.

Figure 17:
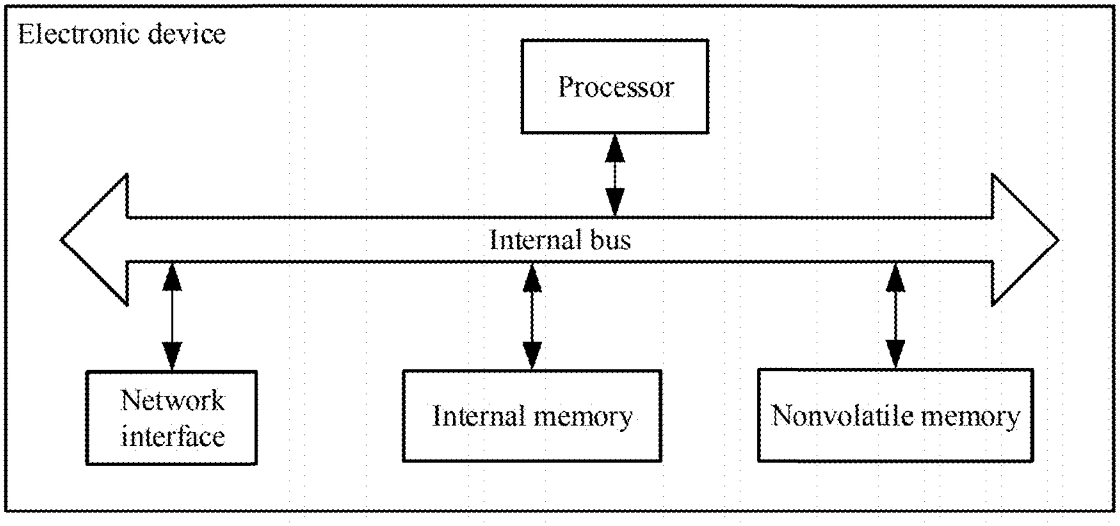
FIG. 17 is a schematic structural diagram 3 illustrating an electronic device, according to one or more embodiments of this specification.

FIG. 17 is a schematic structural diagram illustrating an electronic device, according to one or more embodiments of this specification. Referring to FIG. 17, at a hardware level, the electronic device includes a processor, and can further include an internal bus, a network interface, and a memory. The memory may include an internal memory, for example, a random access memory (RAM), or may further include a nonvolatile memory, for example, at least one disk memory. Certainly, the electronic device may further include hardware needed by another service.

The processor, the network interface, and the memory can be connected to each other through the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For case of representation, in FIG. 17, only one two-way arrow is used to represent the bus, but it does not indicate that there is only one bus or only one type of bus.

The memory is configured to store a program. Specifically, the program can include program code, and the program code includes computer operation instructions. The memory can include the internal memory and the nonvolatile memory and provide instructions and data for the processor.

The processor reads a corresponding computer program from the non-volatile memory into the internal memory and then runs the computer program to logically form a service processing apparatus. The processor executes the program stored in the memory, and is specifically configured to perform the following operations: receiving service ciphertext information and a service session key ciphertext that are sent by a service party, where the service ciphertext information and the service session key ciphertext are generated by a TEE in response to a non-service request of the service party and sent to the service party, the service ciphertext information is obtained after the TEE encrypts, by using a generated service session key, target service data and a device identity certificate of a terminal device to which the TEE belongs, the service session key ciphertext is obtained after the TEE encrypts the service session key by using a service encryption key, the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; decrypting the service session key ciphertext by using the service encryption key to obtain the service session key; decrypting the service ciphertext information by using the service session key, to obtain the device identity certificate and the target service data; performing device identity authentication on the terminal device based on the device identity certificate; and after determining that the terminal device passes device identity authentication, processing the target service based on the target service data.

The method performed by the service processing apparatus disclosed in the embodiment shown in FIG. 8 in this specification can be applied to a processor, or can be implemented by a processor. The processor may be an integrated circuit chip with a signal processing capability. In an implementation process, each step of the above-mentioned method can be completed by an integrated logic circuit of hardware in the processor or instructions in a form of software. The above-mentioned processor can be a general-purpose processor, including a central processing unit (CPU), a network processor (NP), etc., or can be a digital signal processor (DSP), an application-specific integrated circuit (ASIC), a field-programmable gate array (FPGA) or another programmable logic device, a discrete gate or a transistor logic device, and a discrete hardware component. The disclosed methods, steps, and logical block diagrams in the embodiments of this specification can be implemented or performed. The general-purpose processor can be a microprocessor, or the processor can be any conventional processor, etc. The steps of the methods disclosed with reference to the embodiments of this specification can be directly performed by a hardware decoding processor or performed by a combination of hardware and software modules in a decoding processor. The software module can be located in a storage medium mature in the art, for example, an RAM, a flash memory, a read-only memory, a programmable read-only memory or an electrically erasable programmable memory, or a register. The storage medium is located in the memory, and the processor reads information in the memory and completes the steps of the previously described methods by using hardware of the processor.

It should be understood that the electronic device in this embodiment of this specification can implement functions of the service processing apparatus in the embodiment shown in FIG. 8. Because principles are the same, details are omitted in this embodiment of this specification.

Certainly, in addition to software implementations, the electronic device in this specification does not exclude other implementations, for example, a logic device or a combination of hardware and software. In other words, an execution body of the following processing process is not limited to logical units, and can be hardware or a logic device.

An embodiment of this specification further provides a computer readable storage medium. The computer readable storage medium stores one or more programs. The one or more programs include an instruction. When the instruction is being executed by a portable electronic device including a plurality of applications, the portable electronic device performs the method in the embodiment shown in FIG. 8, and is specifically configured to perform the following operations: receiving service ciphertext information and a service session key ciphertext that are sent by a service party, where the service ciphertext information and the service session key ciphertext are generated by a TEE in response to a non-service request of the service party and sent to the service party, the service ciphertext information is obtained after the TEE encrypts, by using a generated service session key, target service data and a device identity certificate of a terminal device to which the TEE belongs, the service session key ciphertext is obtained after the TEE encrypts the service session key by using a service encryption key, the target service data are service data required for processing the target service, and the device identity certificate is used to verify that the terminal device is authentic and trustworthy, where the service encryption key and the device identity certificate are sent by an authentication server to the TEE through a secure channel between the authentication server and the TEE after the authentication server determines, based on device authentication information sent by the TEE, that the terminal device passes device authentication, the device authentication information is sent by the TEE to the authentication server through the secure channel, and the device authentication information is information used to prove an identity of the terminal device; decrypting the service session key ciphertext by using the service encryption key to obtain the service session key; decrypting the service ciphertext information by using the service session key, to obtain the device identity certificate and the target service data; performing device identity authentication on the terminal device based on the device identity certificate; and after determining that the terminal device passes device identity authentication, processing the target service based on the target service data.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

In conclusion, the above-mentioned descriptions are merely example embodiments of this specification, and are not intended to limit the protection scope of this specification. Any modification, equivalent replacement, or improvement made within the spirit and principle of this specification shall fall within the protection scope of this specification.

The system, apparatus, module, or unit illustrated in the above-mentioned embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

The computer readable medium includes persistent, non-persistent, movable, and unmovable media that can store information by using any method or technology. The information can be a computer readable instruction, a data structure, a program module, or other data. An example of the computer storage medium includes but is not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. Based on the definition in this specification, the computer readable medium does not include transitory media such as a modulated data signal and carrier.

The term "include," "comprise," or their any other variants is intended to cover a non-exclusive inclusion, so a process, a method, a product, or a device that includes a series of elements not only includes such elements, but also includes other elements not expressly listed, or further includes elements inherent to such a process, method, product, or device. Without more constraints, an element preceded by "includes a . . . " does not preclude the existence of additional identical elements in the process, method, product or device that includes the element.

The embodiments in this specification are described in a progressive way. For the same or similar parts of the embodiments, references can be made to the embodiments. Each embodiment focuses on a difference from other embodiments. Particularly, the system embodiments are basically similar to the method embodiments, and therefore are described briefly. For related parts, references can be made to some descriptions in the method embodiments.

The invention claimed is:

1. A computer-implemented method, comprising:

receiving, by an authentication server from a trusted execution environment (TEE) of a terminal device, device authentication information through a secure channel between the TEE and the authentication server, wherein the device authentication information is configured to authenticate an identity of the terminal device;

performing, by the authentication server based on the device authentication information, device authentication on the terminal device; and in response to determining that the terminal device passes the device authentication, sending, by the authentication server, a service encryption key and a device identity certificate to the TEE through the secure channel, wherein the service encryption key is configured to encrypt a service session key for encrypting service data, and the device identity certificate indicates authenticity of the terminal device, wherein the service session key is randomly generated by the TEE each time a service party requests to perform service processing, and wherein the TEE encrypts the service session key by using the service encryption key.

2. The computer-implemented method according to claim 1, wherein sending the device authentication information comprises:

encrypting, by the TEE based on a channel key, a device certificate of the terminal device to obtain the device authentication information, wherein the device certificate is pre-stored in the TEE, and the channel key is determined by the TEE and the authentication server through negotiation.

3. The computer-implemented method according to claim 2, wherein performing the device authentication on the terminal device comprises:

decrypting, using the channel key, the device authentication information to obtain the device certificate; and performing the device authentication on the terminal device based on the device certificate.

4. The computer-implemented method according to claim 2, wherein encrypting the device certificate of the terminal device comprises:

signing a challenge code received from the authentication server to obtain first signature information; and encrypting, using the channel key, the device certificate and the first signature information to obtain the device authentication information.

5. The computer-implemented method according to claim 4, wherein performing the device authentication on the terminal device comprises:

decrypting, using the channel key, the device authentication information to obtain the device certificate and the first signature information;

verifying the first signature information;

in response to determining that the first signature information is successfully verified, comparing the challenge code comprised in the first signature information with a locally stored challenge code; and in response to determining that the challenge code is consistent with the locally stored challenge code, performing the device authentication on the terminal device based on the device certificate.

6. The computer-implemented method according to claim 2, wherein determining the channel key comprises:

sending, by the authentication server to the TEE, first authentication information that represents an identity of the authentication server;

performing, by the TEE based on the first authentication information, identity authentication on the authentication server;

sending, by the TEE to the authentication server, second authentication information that represents an identity of the TEE;

performing, by the authentication server based on the second authentication information, identity authentication on the TEE; and determining, by the TEE and the authentication server in a handshake manner, the channel key.

7. The computer-implemented method according to claim 1, wherein sending the service encryption key and the device identity certificate to the TEE comprises:

encrypting, using a channel key, the service encryption key and the device identity certificate to obtain an encrypted service encryption key and an encrypted device identity certificate, wherein the channel key is determined by the authentication server and the TEE through negotiation; and sending the encrypted service encryption key and the encrypted device identity certificate to the TEE.

8. The computer-implemented method according to claim 1, wherein the service encryption key corresponds to a target service, and wherein the service encryption key is configured to encrypt the service session key of the target service.

9. The computer-implemented method according to claim 8, wherein the service session key is randomly generated by the TEE for the target service.

10. The computer-implemented method according to claim 1, further comprising:

receiving, by the TEE from a service party, a request to perform a target service and service data corresponding to the target service;

encrypting, by the TEE using the service session key, the device identity certificate of the terminal device and the service data to obtain service ciphertext information;

encrypting, by the TEE using the service encryption key, the service session key to obtain a service session key ciphertext;

sending, by the TEE to the service party, the service ciphertext information and the service session key ciphertext;

sending, by the service party to a server, the service ciphertext information and the service session key ciphertext;

decrypting, by the server using the service encryption key, the service session key ciphertext to obtain the service session key;

decrypting, by the server using the service session key, the service ciphertext information to obtain the device identity certificate and the service data;

performing, by the server, device identity authentication on the terminal device based on the device identity certificate; and in response to determining that the terminal device passes device identity authentication, processing the target service based on the service data.

11. The computer-implemented method according to claim 10, wherein encrypting, by the TEE, the device identity certificate of the terminal device and the service data to obtain service ciphertext information comprises:

generating a service identity private key based on a user identifier of a target user and a device identity private key pre-stored in the TEE, wherein the request comprises the user identifier; and signing, using the service identity private key, the device identity certificate and the service data to generate second signature information; and encrypting, using the service session key, the second signature information to obtain the service ciphertext information.

12. The computer-implemented method according to claim 11, wherein decrypting, by a service server using the service session key, the service ciphertext information to obtain the device identity certificate and the service data comprises:

decrypting, using the service session key, the service ciphertext information to obtain the second signature information;

generating, based on the user identifier and a device identity public key of the TEE, a service identity public key; and verifying, based on the service identity public key, the second signature information to obtain the device identity certificate and the service data.

13. A non-transitory, computer-readable medium storing one or more instructions executable by a computer system to perform operations comprising:

receiving, by an authentication server from a trusted execution environment (TEE) of a terminal device, device authentication information through a secure channel between the TEE and the authentication server, wherein the device authentication information is configured to authenticate an identity of the terminal device;

performing, by the authentication server based on the device authentication information, device authentication on the terminal device; and in response to determining that the terminal device passes the device authentication, sending, by the authentication server, a service encryption key and a device identity certificate to the TEE through the secure channel, wherein the service encryption key is configured to encrypt a service session key for encrypting service data, and the device identity certificate indicates authenticity of the terminal device, wherein the service session key is randomly generated by the TEE each time a service party requests to perform service processing, and wherein the TEE encrypts the service session key by using the service encryption key.

14. The non-transitory, computer-readable medium according to claim 13, wherein sending the device authentication information comprises:

encrypting, by the TEE based on a channel key, a device certificate of the terminal device to obtain the device authentication information, wherein the device certificate is pre-stored in the TEE, and the channel key is determined by the TEE and the authentication server through negotiation.

15. The non-transitory, computer-readable medium according to claim 14, wherein performing the device authentication on the terminal device comprises:

decrypting, using the channel key, the device authentication information to obtain the device certificate; and performing the device authentication on the terminal device based on the device certificate.

16. The non-transitory, computer-readable medium according to claim 14, wherein encrypting the device certificate of the terminal device comprises:

signing a challenge code received from the authentication server to obtain first signature information; and encrypting, using the channel key, the device certificate and the first signature information to obtain the device authentication information.

17. The non-transitory, computer-readable medium according to claim 16, wherein performing the device authentication on the terminal device comprises:

decrypting, using the channel key, the device authentication information to obtain the device certificate and the first signature information;

verifying the first signature information;

in response to determining that the first signature information is successfully verified, comparing the challenge code comprised in the first signature information with a locally stored challenge code; and in response to determining that the challenge code is consistent with the locally stored challenge code, performing the device authentication on the terminal device based on the device certificate.

18. The non-transitory, computer-readable medium according to claim 14, wherein determining the channel key comprises:

sending, by the authentication server to the TEE, first authentication information that represents an identity of the authentication server;

performing, by the TEE based on the first authentication information, identity authentication on the authentication server;

sending, by the TEE to the authentication server, second authentication information that represents an identity of the TEE;

performing, by the authentication server based on the second authentication information, identity authentication on the TEE; and determining, by the TEE and the authentication server in a handshake manner, the channel key.

19. The non-transitory, computer-readable medium according to claim 13, wherein sending the service encryption key and the device identity certificate to the TEE comprises:

encrypting, using a channel key, the service encryption key and the device identity certificate to obtain an encrypted service encryption key and an encrypted device identity certificate, wherein the channel key is determined by the authentication server and the TEE through negotiation; and sending the encrypted service encryption key and the encrypted device identity certificate to the TEE.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by an authentication server from a trusted execution environment (TEE) of a terminal device, device authentication information through a secure channel between the TEE and the authentication server, wherein the device authentication information is configured to authenticate an identity of the terminal device;

performing, by the authentication server based on the device authentication information, device authentication on the terminal device; and in response to determining that the terminal device passes the device authentication, sending, by the authentication server, a service encryption key and a device identity certificate to the TEE through the secure channel, wherein the service encryption key is configured to encrypt a service session key for encrypting service data, and the device identity certificate indicates authenticity of the terminal device, wherein the service session key is randomly generated by the TEE each time a service party requests to perform service processing, and wherein the TEE encrypts the service session key by using the service encryption key.

* * * * *